(12) United States Patent
Tiirola et al.

(10) Patent No.: US 12,082,240 B2
(45) Date of Patent: Sep. 3, 2024

(54) UPLINK OPERATION FOR LISTEN BEFORE TALK

(71) Applicant: Nokia Technologies Oy, Espoo (FI)

(72) Inventors: Esa Tiirola, Kempele (FI); Kari Hooli, Oulu (FI); Timo Lunttila, Espoo (FI); Karol Schober, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 555 days.

(21) Appl. No.: 17/417,801

(22) PCT Filed: Dec. 31, 2019

(86) PCT No.: PCT/FI2019/050934
§ 371 (c)(1),
(2) Date: Jun. 24, 2021

(87) PCT Pub. No.: WO2020/144399
PCT Pub. Date: Jul. 16, 2020

(65) Prior Publication Data
US 2022/0078841 A1    Mar. 10, 2022

Related U.S. Application Data

(60) Provisional application No. 62/805,528, filed on Feb. 14, 2019, provisional application No. 62/790,123, filed on Jan. 9, 2019.

(51) Int. Cl.
*H04W 74/00* (2009.01)
*H04W 74/0808* (2024.01)
(52) U.S. Cl.
CPC ..... *H04W 74/006* (2013.01); *H04W 74/0808* (2013.01)

(58) Field of Classification Search
CPC ... H04W 72/02; H04W 72/23; H04W 72/232; H04W 74/006; H04W 74/0808; H04W 74/0816
See application file for complete search history.

(56) References Cited

U.S. PATENT DOCUMENTS 10,045,376 B2   8/2018  Yang et al.
2015/0195849 A1  7/2015  Bashar et al.
(Continued)

FOREIGN PATENT DOCUMENTS

WO    2017/164719 A1    9/2017
WO    2018/172620 A1    9/2018

OTHER PUBLICATIONS

Office action received for corresponding Indian Patent Application No. 202147033955, dated Mar. 3, 2022, 5 pages.
(Continued)

*Primary Examiner* — Pao Sinkantarakorn
(74) *Attorney, Agent, or Firm* — Harrington & Smith

(57) ABSTRACT

In accordance with example embodiments of the invention as disclosed herein there is a method and apparatus to perform at least identifying, by a network node, a need to perform an uplink transmission within a channel occupancy time of radio channel, wherein the network node is scheduled for performing an uplink transmission, and wherein the identifying comprises identifying an energy level of a gap of channel occupancy time of radio when indicated in downlink control information; based on the identifying, setting a duration of a transmission in the channel occupancy time of radio channel; and performing the uplink transmission based on the set duration of the transmission.

16 Claims, 16 Drawing Sheets

(56) References Cited

U.S. PATENT DOCUMENTS

| | | | |
|---|---|---|---|
| 2018/0227911 | A1 | 8/2018 | Belghoul et al. |
| 2021/0274551 | A1* | 9/2021 | Takata .................. H04W 72/21 |
| 2021/0298045 | A1* | 9/2021 | Kim .................. H04W 72/0453 |
| 2021/0385850 | A1* | 12/2021 | Yoshioka .............. H04W 72/23 |
| 2021/0410187 | A1* | 12/2021 | Yang ................. H04W 74/0808 |

OTHER PUBLICATIONS

Office action received for corresponding Indonesian Patent Application No. P00202104763, dated Jun. 19, 2023, 2 pages of office action and 2 pages of translation available.

Extended European Search Report received for corresponding European Patent Application No. 19909581.1, dated Jul. 7, 2022, 8 pages.

"Chairman's notes of AI 7.2.2 Study on NR-based Access to Unlicensed Spectrum", 3GPP TSG-RAN WG1 Meeting #95, R1-1813847, Agenda : 7.2.2, Ericsson, Nov. 12-16, 2018, 14 pages.

"Revised SID on NR-based Access to Unlicensed Spectrum", 3GPP TSG RAN Meeting #80, RP-181339, Agenda : 9.4.3, Qualcomm Incorporated, Jun. 11-14, 2018, 5 pages.

"On the Frame structure and Wideband operation for NR-U", 3GPP TSG RAN WG1 Meeting #94bis, R1-1810613, Agenda : 7.2.2.2, Nokia, Oct. 8-12, 2018, 13 pages.

"3rd Generation Partnership Project; Technical Specification Group Radio Access Network; Study on Licensed-Assisted Access to Unlicensed Spectrum; (Release 13)", 3GPP TR 36.889, V13.0.0, Jun. 2015, 285 pages.

"3rd Generation Partnership Project; Technical Specification Group Radio Access Network; Study on NR-based access to unlicensed spectrum (Release 16)", 3GPP TR 38.889, V16.0.0, Dec. 2018, pp. 1-119.

"5 GHz RLAN; Harmonised Standard covering the essential requirements of article 3.2 of Directive 2014/53/EU", ETSI EN 301 893, V 2.1.1, May 2017, pp. 1-122.

"New WID on NR-based Access to Unlicensed Spectrum", 3GPP TSG RAN Meeting #82, RP-182878, Agenda : 9.1.1, Qualcomm Inc, Dec. 10-13, 2018, 8 pages.

International Search Report and Written Opinion received for corresponding Patent Cooperation Treaty Application No. PCT/FI2019/050934, dated Mar. 26, 2020, 12 pages.

Office action received for corresponding Indonesian Patent Application No. P00202104763, dated Oct. 12, 2023, 2 pages of office action and 2 pages of translation available.

* cited by examiner

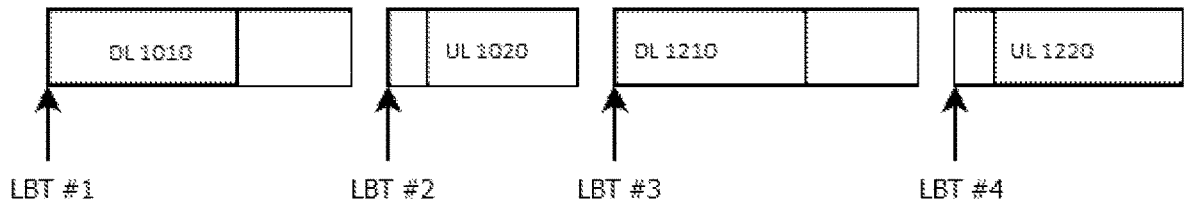

FIG. 1A

Table 7.2.1.3.1-1: Channel access schemes for initiating a COT by gNB as LBE device

|  | Cat 2 LBT | Cat 4 LBT |
|---|---|---|
| DRS alone or multiplexed with non-unicast data (e.g. OSI, paging, RAR) | When the DRS duty cycle ≤1/20, and the total duration is up to 1 ms: 25 µs Cat 2 LBT is used (as in LAA) | When DRS duty cycle > 1/20, or total duration > 1 ms |
| DRS multiplexed with unicast data | N/A except for the cases discussed in the Note below | Channel access priority class is selected according to the multiplexed data |
| PDCCH and PDSCH | N/A except for the cases discussed in the Note below | Channel access priority class is selected according to the multiplexed data |

FIG. 1B

Table 7.2.1.3.1-3: Channel access schemes for a UL burst within a gNB-initiated COT as LBE device

| Cat 1 Immediate transmission | Cat 2 LBT | Cat 4 LBT |
|---|---|---|
| When the gap from the end of the DL transmission to the beginning of the UL burst is not more than 16 msec. Note: Maximum limits of the duration of the UL burst other than those already derived from MCOT duration limits should be further discussed when specifications are developed. | For any of the following cases:<br><br>- When the gap between any two successive scheduled/granted transmissions in the COT is not greater than 25 msec<br><br>- For the case where a UL transmission in the gNB initiated COT is not followed by a DL transmission in the same COT<br><br>- Note: the duration from the start of the first transmission within the channel occupancy until the end of the last transmission in the same channel occupancy shall not exceed 20 ms. | N/A |

FIG. 1C

| $\mu$ | Sf [kHz] | Symbol duration | $l = 0$ or $l = (7 \times \text{power}(2,\mu))$ CP Duration (us) | $l = 0$ or $l = 7 \times 2$ | $l = 0$ or $l = (7 \times \text{power}(2,\mu))$ Duration Symbol+CP | $l = 0$ or $l = 7 \times 2$ |
|---|---|---|---|---|---|---|
| 0 | 15 | 66.7 | 5.2 | 4.7 | 71.9 | 71.4 |
| 1 | 30 | 33.3 | 2.9 | 2.3 | 36.2 | 35.7 |
| 2 | 60 | 16.7 | 1.7 | 1.2 | 18.4 | 17.8 |
| 3 | 120 | 8.3 | 1.1 | 0.6 | 9.4 | 8.9 |
| 4 | 240 | 4.2 | 0.8 | 0.3 | 5.0 | 4.5 |

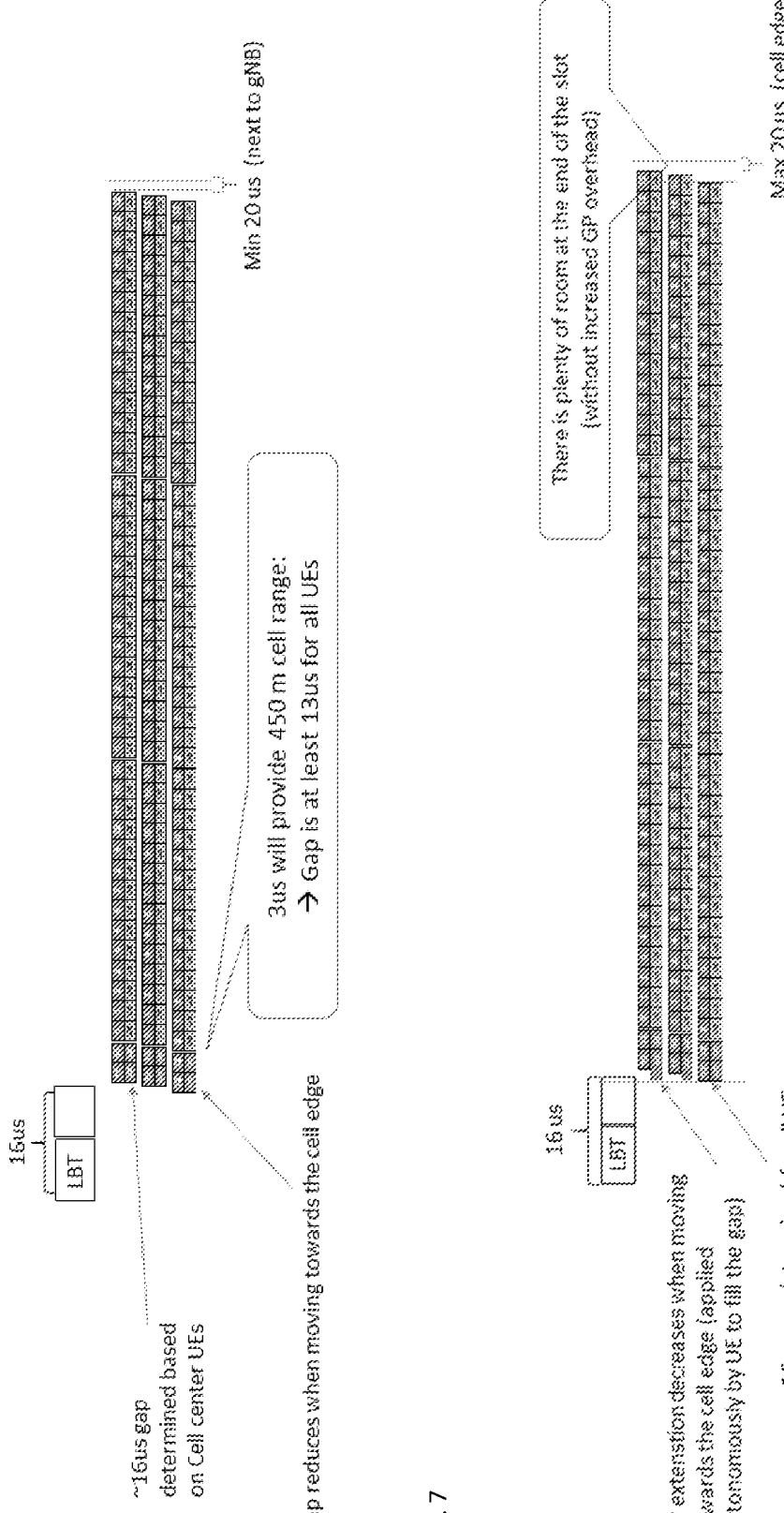

UPLINK OPERATION FOR LISTEN BEFORE TALK

RELATED APPLICATIONS

This application was originally filed as PCT Application No. PCT/FI2019/050934 on Dec. 31, 2019, which claims priority from U.S. Provisional Application No. 62/790,123 filed on Jan. 9, 2019 and further from U.S. Provisional Application No. 62/805,528 filed on Feb. 14, 2019, each of which is incorporated herein by reference in its entirety.

TECHNICAL FIELD

The teachings in accordance with the exemplary embodiments of this invention relate generally to physical layer design of radio communications and, more specifically, relate to improving uplink channel access in the conditions where channel occupancy detection procedures such as a listen before talk procedure prevents a scheduled physical uplink shared channel transmission from happening.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
CCA Clear Channel Assessment
COT Channel Occupancy Time
CP Cyclic prefix
DCI Downlink control information
eNB LTE base station
GC Group common
gNB NR base station
GP Guard period
LAA Licensed-Assisted Access
LBE Load Based Equipment
LBT Listen before talk
COT Maximum Maximum time for COT (e.g., defined by the regulator)
IT Immediate Transmission
NR New Radio
NR-U New Radio Unlicensed
OFDM Orthogonal Frequency Division Multiplexing
PDCCH Physical Downlink Control Channel
PDSCH Physical Downlink Shared Channel
PRI PUCCH Resource Indicator
PUCCH Physical uplink control channel
PUSCH Physical uplink shared channel
RS Reference Signal
TA Timing Advance
TTI Transmission Time Interval
Tx Transmit
UCI Uplink Control Information
UE User Equipment
UL Uplink
μs micro-second
WiFi A network node operating under IEEE 802.11 standards Communications systems such as wireless communications systems are broadly deployed to provide various types of communication such as voice, video, packet data, messaging, broadcast, and so on, and are capable of supporting communication with multiple users by sharing the available system resources.

Some wireless systems may enable communication between a network device and a user equipment over shared or unlicensed radio frequency spectrum bands, or over different licensed radio frequency spectrum bands. When using a shared or unlicensed radio frequency spectrum band, transmitters (e.g., UEs, base stations, or other network devices) may perform contention-based channel access, such as by a listen before talk (LBT) procedure) according to rules that provide for fair channel access to transmitters that wish to use the shared radio frequency spectrum band.

Example embodiments of the invention work to improve at least these operations.

SUMMARY

In an example aspect of the invention, there is an apparatus, such as a user equipment side apparatus, comprising identifying, by a network node, a need to perform an uplink transmission within a channel occupancy time of radio channel, wherein the network node is scheduled for performing an uplink transmission, and wherein the identifying comprises identifying an energy level of a gap of channel occupancy time of radio when indicated in downlink control information; based on the identifying, setting a duration of a transmission in the channel occupancy time of radio channel; and performing the uplink transmission based on the set duration of the transmission.

A further example embodiment is a method comprising the method of the previous paragraph, wherein the downlink control information comprises at least one information element indicating whether or not the user equipment should perform identifying of an energy level of the gap in the channel occupancy time of radio, wherein determining based on downlink control information whether or not the UE should perform identifying of the energy level of the gap in the channel occupancy time of radio is carried out only when the UE is scheduled to operate according to the first transmission (Tx) duration, wherein the setting further comprises: setting a duration of a gap in the channel occupancy time of radio channel; and performing the uplink transmission based on the setting the duration of the gap, wherein the setting comprises identifying, based on an energy level of the gap in the channel occupancy time of radio channel being one of above or below a threshold, whether the gap is occupied or not, wherein the energy level being above or below the threshold is identified using a single listen before talk measurement interval, wherein there is based on the identifying, setting the duration of the transmission to a first transmission (Tx) duration if the energy level of the gap is above the threshold; and setting the duration of the transmission to a second transmission (Tx) duration exceeding the first duration if the energy level of the gap is below the threshold, wherein the uplink transmission is not performed during the gap, wherein based on the energy level of the gap being above the threshold, the scheduled transmission is performed immediately after the gap during the channel occupancy time, wherein the user equipment is scheduled with more than one transmission time interval for the uplink transmission, wherein based on identifying that the energy level of the gap being above the threshold the user equipment performs the uplink transmission using only the at least one transmission time interval within a first time duration, and based on identifying that the energy level of the gap being below the threshold the user equipment performs the uplink transmission using all scheduled transmission time intervals in a time duration exceeding the first time duration, wherein there is inserting an additional gap in predefined locations within one of the scheduled uplink transmission; and performing an additional up to 25 µs listen before talk operation during the channel occupancy time, wherein based on the energy level of the gap not being above the threshold, a listen before talk procedure is performed in 9 µs of the gap, wherein another 7 µs of the gap is used for DL-to-UL point, wherein the identifying comprises also determining based on downlink control information whether or not the UE is allowed to transmit according to the second transmission (Tx) duration, in the case when the energy level of the gap being below the threshold, wherein based on the energy level of the gap being below the threshold, further comprising inserting a dummy signal comprising one of symbol repetition or an extended cyclic prefix in at least one predefined location within one transmit time interval of the scheduled uplink transmission, wherein at least a first 9 µs of the uplink transmission comprises a dummy signal or an extended cyclic prefix, wherein an additional 9 µs of a dummy signal or extended cyclic prefix is added to a beginning of the uplink transmission, and wherein the dummy signal allows symbol level alignment between more than one user equipment which uses the channel occupancy time.

A non-transitory computer-readable medium storing program code, the program code executed by at least one processor to perform at least the method as described in the paragraphs above.

In another example aspect of the invention, there is an apparatus comprising: means for identifying, by a network node, a need to perform an uplink transmission within a channel occupancy time of radio channel, wherein the network node is scheduled for performing an uplink transmission, and wherein the identifying comprises identifying an energy level of a gap of channel occupancy time of radio when indicated in downlink control information; means, based on the identifying, for setting a duration of a transmission in the channel occupancy time of radio channel; and means for performing the uplink transmission based on the set duration of the transmission.

A further example embodiment is an apparatus comprising the apparatus of the previous paragraphs, wherein the identifying comprises also means for determining based on downlink control information, wherein the downlink control information comprises at least one information element indicating whether or not the user equipment should perform identifying of an energy level of the gap in the channel occupancy time of radio, wherein determining based on downlink control information whether or not the UE should perform identifying of the energy level of the gap in the channel occupancy time of radio is carried out only when the UE is scheduled to operate according to the first transmission (Tx) duration, wherein the setting further comprises: means for setting a duration of a gap in the channel occupancy time of radio channel; and means for performing the uplink transmission based on the setting the duration of the gap, wherein the setting comprises identifying, based on an energy level of the gap in the channel occupancy time of radio channel being one of above or below a threshold, whether the gap is occupied or not, wherein the energy level being above or below the threshold is identified using a single listen before talk measurement interval, wherein there is means, based on the identifying, for setting the duration of the transmission to a first transmission (Tx) duration if the energy level of the gap is above the threshold; and means for setting the duration of the transmission to a second transmission (Tx) duration exceeding the first duration if the energy level of the gap is below the threshold, wherein the uplink transmission is not performed during the gap, wherein based on the energy level of the gap being above the threshold, the scheduled transmission is performed immediately after the gap during the channel occupancy time, wherein the user equipment is scheduled with more than one transmission time interval for the uplink transmission, wherein based on identifying that the energy level of the gap being above the threshold the user equipment performs the uplink transmission using only the at least one transmission time interval within a first time duration, and based on identifying that the energy level of the gap being below the threshold the user equipment performs the uplink transmission using all scheduled transmission time intervals in a time duration exceeding the first time duration, wherein there is means for inserting an additional gap in predefined locations within one of the scheduled uplink transmission; and means for performing an additional up to 25 µs listen before talk operation during the channel occupancy time, wherein based on the energy level of the gap not being above the threshold, listen before talk procedure is performed in 9 µs of the gap, wherein another 7 µs of the gap is used for DL-to-UL point, wherein the identifying comprises also determining based on downlink control information whether or not the UE is allowed to transmit according to the second transmission (Tx) duration, in the case when the energy level of the gap being below the threshold, wherein based on the energy level of the gap being below the threshold, further comprising inserting a dummy signal comprising one of symbol repetition or an extended cyclic prefix in at least one predefined location within one transmit time interval of the scheduled uplink transmission, wherein at least a first 9 µs of the uplink transmission comprises a dummy signal or an extended cyclic prefix, wherein an additional 9 µs of a dummy signal or extended cyclic prefix is added to a beginning of the uplink transmission, and wherein the dummy signal allows symbol level alignment between more than one user equipment which uses the channel occupancy time.

In accordance with the example embodiments as described in the paragraph above, at least the means for identifying, setting, and performing comprises a network interface, and computer program code stored on a computer-readable medium and executed by at least one processor.

In another example aspect of the invention, there is an apparatus, such as a user equipment side apparatus, comprising: at least one processor; and at least one memory including computer program code, where the at least one memory and the computer program code are configured, with the at least one processor, to cause the apparatus to at least: identify, by a network node, a need to perform an uplink transmission within a channel occupancy time of radio channel, wherein the network node is scheduled for performing an uplink transmission, and wherein the identifying comprises identifying an energy level of a gap of channel occupancy time of radio when indicated in downlink control information; based on the identifying, set a duration of a transmission in the channel occupancy time of radio channel; and perform the uplink transmission based on the set duration of the transmission.

A further example embodiment is an apparatus comprising the apparatus of the previous paragraphs, wherein the identifying comprises the apparatus is caused, based on downlink control information, wherein the downlink control information comprises at least one information element for use to determine whether or not the user equipment should perform identifying of an energy level of the gap in the channel occupancy time of radio, wherein determining based on downlink control information whether or not the UE should perform identifying of the energy level of the gap in the channel occupancy time of radio is carried out only when the UE is scheduled to operate according to the first transmission (Tx) duration, wherein the setting further comprises: means for setting a duration of a gap in the channel occupancy time of radio channel; and the apparatus is caused to perform the uplink transmission based on the setting the duration of the gap, wherein the setting comprises identifying, based on an energy level of the gap in the channel occupancy time of radio channel being one of above or below a threshold, whether the gap is occupied or not, wherein the energy level being above or below the threshold is identified using a single listen before talk measurement interval, wherein the apparatus is caused, based on the identifying, to set the duration of the transmission to a first transmission (Tx) duration if the energy level of the gap is above the threshold; and the apparatus is caused to set the duration of the transmission to a second transmission (Tx) duration exceeding the first duration if the energy level of the gap is below the threshold, wherein the uplink transmission is not performed during the gap, wherein based on the energy level of the gap being above the threshold, the scheduled transmission is performed immediately after the gap during the channel occupancy time, wherein the user equipment is scheduled with more than one transmission time interval for the uplink transmission, wherein based on identifying that the energy level of the gap being above the threshold the user equipment performs the uplink transmission using only the at least one transmission time interval within a first time duration, and based on identifying that the energy level of the gap being below the threshold the user equipment performs the uplink transmission using all scheduled transmission time intervals in a time duration exceeding the first time duration, wherein the apparatus is caused to insert an additional gap in predefined locations within one of the scheduled uplink transmission; and the apparatus is caused to perform an additional up to 25 µs listen before talk operation during the channel occupancy time, wherein based on the energy level of the gap not being above the threshold, listen before talk procedure is performed in 9 µs of the gap, wherein another 7 µs of the gap is used for DL-to-UL point, wherein the identifying comprises also determining based on downlink control information whether or not the UE is allowed to transmit according to the second transmission (Tx) duration, in the case when the energy level of the gap being below the threshold, wherein based on the energy level of the gap being below the threshold, further comprising inserting a dummy signal comprising one of symbol repetition or an extended cyclic prefix in at least one predefined location within one transmit time interval of the scheduled uplink transmission, wherein at least a first 9 µs of the uplink transmission comprises a dummy signal or an extended cyclic prefix, wherein an additional 9 µs of a dummy signal or extended cyclic prefix is added to a beginning of the uplink transmission, and wherein the dummy signal allows symbol level alignment between more than one user equipment which uses the channel occupancy time.

BRIEF DESCRIPTION OF THE DRAWINGS

The foregoing and other aspects of embodiments of this invention are made more evident in the following Detailed Description, when read in conjunction with the attached Drawing Figures, wherein:

FIG. 1A shows an example of three switching points within a COT;

FIG. 1B shows Table 7.2.1.3.1-1 of 3GPP TR 38.889 V16.0.0 (December 2018): Channel access schemes for initiating a COT by gNB as Load Based Equipment (LBE) device;

FIG. 1C shows Table 7.2.1.3.1-3 of 3GPP TR 38.889 V16.0.0 (December 2018): Channel access schemes for a UL burst within a gNB-initiated COT as LBE device;

FIG. 7 shows Timing option #1 in accordance with example embodiments of the invention;

FIG. 8. shows Timing option #2 in accordance with example embodiments of the invention;

DETAILED DESCRIPTION

Figure 2:
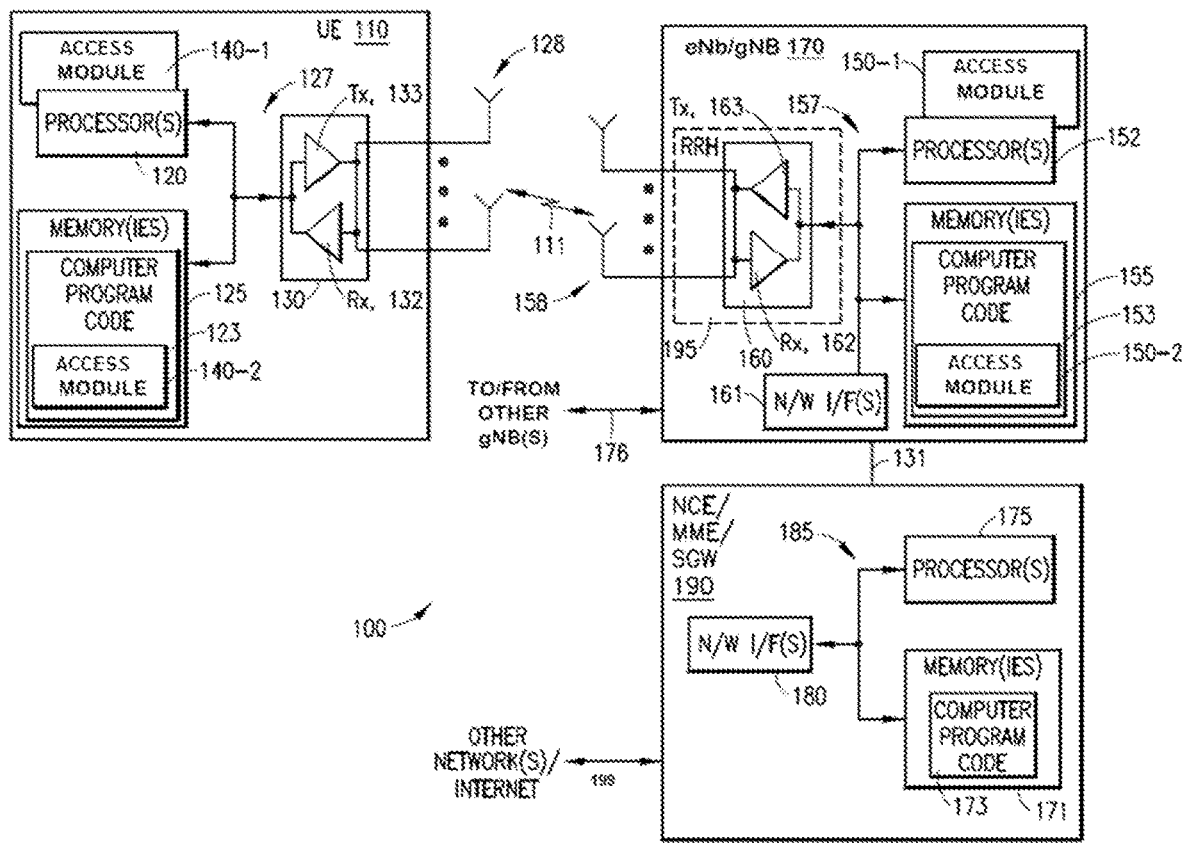
FIG. 2 shows a high level block diagram of various devices that can be used in carrying out various aspects of the invention.

In this invention, there is proposed an improved physical layer design of radio communications. and more specifically there is proposed an improved method of uplink (UL) channel access in the conditions where channel occupancy detection procedures such as a listen before talk procedure prevents the scheduled physical uplink shared channel (PUSCH) transmission from being transmitted.

On unlicensed band, a transmitting entity may acquire access to the channel with appropriate channel access procedure, e.g., with an energy detection listen-before-talk (LBT) procedure. The one or more transmissions following a successful channel access acquisition form a channel occupancy time (COT) and have a limited duration. The transmitting entity initiating the COT, e.g., gNB, may share its COT with devices responding to it, e.g., with an UE, so that the COT may contain also one or more transmissions from the responding devices.

In LTE LAA and MulteFire, three channel access procedures are defined for uplink: Type 1 (a variant of Category 4 energy detection LBT procedure), Type 2 (a variant of Category 2 energy detection LBT procedure) and TYPE 3 (a variant of Category 1 Immediate transmission (IT)):

- In Type 1 LBT, UE generates a random number N uniformly distributed over a contention window (where the size of contention window depends on the channel access priority class of the traffic). Once UE has measured the channel to be vacant for N times, UE may occupy the channel with transmission. To align the transmission with LTE subframe boundary, UE may need to resort to self-deferral during the LBT procedure; and
- In Type 2 LBT, UE performs single channel measurement in time interval of 25 μs before UL transmission. For PUSCH, this type of LBT may be performed when eNB shares channel occupancy time (COT) with the UE. (In other words, eNB has contended for the channel using Cat 4 LBT and once eNB has obtained access to the channel, it allows UEs to use a portion of its channel occupancy time for UL transmissions).
- In Type 3 IT, UE does not perform LBT when the gap from the end of the DL transmission to the beginning of the UL burst is not more than 16 us. The duration of UL burst is short.

Within a LBT procedure, a channel is measured to be vacant (or idle or unoccupied) if the energy measured on the channel within a measurement period is below an energy threshold. Correspondingly, a channel is measured to be occupied if the energy measured on the channel during a measurement period or an observation slot is above an energy threshold. The energy threshold is predetermined and may depend e.g., on the intended transmission power. A single measurement may be referred to as a Clear Channel Assessment (CCA).

It is noted that it may be desired to support UL transmission with Type 2 LBT within gNB acquired COT also on NR-unlicensed, as it supports efficiently scheduled UL as well as UL FDMA.

Description of the Related Art—COT Structure

In both LTE LAA and Multefire, eNB acquired COT contains a DL portion and up-to one UL portion. It was agreed in RAN1 #93 that "Single and multiple DL to UL and UL to DL switching within a shared gNB COT is identified to be beneficial and can be supported". FIG. 1A shows an example of three switching points within a COT. Support for multiple switching points can provide e.g., improved latency performance without increasing the overhead of frequent (Type 1) channel access procedures too much. From HARQ/scheduling point of view, it is not a problem to support COT with multiple switching points: Similar functionality is supported already for NR licensed band operation.

FIG. 1A shows an example of three switching points within a COT. As shown in FIG. 1A there is an (listen before talk (LBT)) LBT #1, LBT #2, LBT #3, and LBT #4. As shown in FIG. 1A the LBT #1 and LBT #3 are before a switch to a DL and the LBT #2 and LBT #4 are before a switch to an UL.

According to section 7.2.1.3.1 of 3GPP TR 38.889 V16.0.0 (December 2018) if absence of Wi-Fi cannot be guaranteed (e.g., by regulation) in the band (sub-7 GHz) where NR-U is operating, the baseline assumption is, the NR-U operating bandwidth is an integer multiple of 20 MHz.

For channel access mechanism, LTE-LAA LBT mechanism is adopted as baseline for 5 GHz band and adopted as the starting point of the design for 6 GHz band. At least for band where absence of Wi-Fi cannot be guaranteed (e.g., by regulation), LBT can be performed in units of 20 MHz.

For 5 GHz band, having a 16 μs gap to accommodate for the transceiver turnaround before the immediate transmission of the responding node is beneficial for NR-U, such as for supporting fast A/N feedback, and is permitted by regulation. Restrictions/conditions on when this option can be used will be further identified, e.g., in consideration of fair coexistence.

FIG. 1B shows Table 7.2.1.3.1-1 of 3GPP TR 38.889 V16.0.0 (December 2018): Channel access schemes for initiating a COT by gNB as LBE device. As shown in FIG. 1B there are channel access schemes for Cat 2 LBT and Cat 4 LBT when a DRS is alone of multiplexed with non-unicast data, for when DRS is multiplexed with unicast data, and for when there is PDCCH and PDSCH.

It is noted that an applicability of an LBT scheme other than Cat 4 LBT for control messages related to initial/random access, mobility, paging, reference signals only, and PDCCH-only transmissions, e.g., "RACH message 4", handover command, GC-PDCCH, or short message paging transmitted either alone or when multiplexed with DRS have been discussed. Further details related to exceptions in this note can be determined when specifications are developed.

FIG. 1C shows Table 7.2.1.3.1-3 of 3GPP TR 38.889 V16.0.0 (December 2018): Channel access schemes for a UL burst within a gNB-initiated COT as LBE device. As shown in FIG. 1C there are channel access schemes for Cat 1 immediate transmission, Cat 2 LBT, and Cat 4 LBT.

It is noted that here an UL burst is defined as a set of transmissions from a given UE having no gaps or gaps of no more than 16 μs. Transmissions from a UE having a gap of more than 16 μs are considered as separate UL bursts. The number of LBT attempts within a COT should be determined when specifications are developed.

For initiation of a COT by the UE, the channel access schemes in Table 7.2.1.3.1-4 of 3GPP TR 38.889 V16.0.0 (December 2018): are used.

New Radio Channel Access Schemes

The channel access schemes for NR-based access for unlicensed spectrum can be classified into the following categories, following the channel access categorization introduced in TR 36.889 Section 8.2:

- Category 1: Immediate transmission after a short switching gap;
  - This is used for a transmitter to immediately transmit after a switching gap inside a COT, and
  - The switching gap from reception to transmission is to accommodate the transceiver turnaround time and is no longer than 16 μs;
- Category 2: LBT without random back-off
  - The duration of time that the channel is sensed to be idle before the transmitting entity transmits is deterministic,
- Category 3: LBT with random back-off with a contention window of fixed size, and The LBT procedure has the following procedure as one of its components. The transmitting entity draws a random number N within a contention window. The size of the contention window is specified by the minimum and maximum value of N. The size of the contention window is fixed. The random number N is used in the LBT procedure to determine the duration of time that the channel is sensed to be idle before the transmitting entity transmits on the channel;

Category 4: LBT with random back-off with a contention window of variable size:

The LBT procedure has the following as one of its components. The transmitting entity draws a random number N within a contention window. The size of contention window is specified by the minimum and maximum value of N. The transmitting entity can vary the size of the contention window when drawing the random number N. The random number N is used in the LBT procedure to determine the duration of time that the channel is sensed to be idle before the transmitting entity transmits on the channel.

For different transmissions in a COT and different channels/signals to be transmitted, different categories of channel access schemes can be used.

In the context of this application, following channel access categories are used:

Cat 1 Immediate transmission: Transmitting entity starts transmission immediately after a short gap to a preceding transmission by another transmitting entity, e.g., gNB. The gap between the transmissions is limited to be shorter than or equal to a predefined duration. The predefined duration may be e.g., 16 μs. No measurements on the channel, e.g., to determine the vacancy of the channel, is performed during the gap;

Cat 2 LBT: Transmitting entity performs single Clear Channel Assessment or channel measurement within a period of a predefined duration. In the case that the channel is sensed to be vacant or idle based on the Clear Channel Assessment or channel measurement, the transmitting entity starts transmission immediately after the period. The predefined duration of the period may be e.g., 25 μs. In some examples, the transmitting entity may perform two CCAs instead of single CCA within the period, in which case the channel is required to be sensed idle in both CCAs for transmission to be allowed. The channel measurement period or observation slot for the CCA may be e.g., 9 μs.

It is noted that some example embodiments of the invention as described herein focus on scenarios such as below and/or in FIG. 1C.

Problems of "Cat 1 Immediate Transmission":

When operating according to rules (being) defined for Cat 1 framework, the UE may be allowed to transmit only a short period of time after the downlink portion of COT, e.g., compared to Cat 2 LBT. This is the case even if the channel would be unoccupied. Hence, Cat 1 approach will have a negative impact on UL throughput and latency, because only very short UL transmission is allowed in the gNB acquired COT.

Problem of "Cat 2 LBT":

When operating based on gNB acquired COT, it is possible that when the transmitter (gNB) sees a clear channel based on energy detection, the receiver (UE) may be actually encountering interference from an adjacent node (Wi-Fi AP or STA, gNB or UE). This is referred to as hidden node problem, and in these cases (see FIG. 1A):

LBT #1 (by a gNB) may succeed; but
LBT #2 (by UE) may not succeed for one or more UEs scheduled by the gNB.

This kind of issue is present especially in a dense deployment of NR-U. The situation gets even worse in the cases having Wi-Fi systems deployed on the same carrier and/or when the traffic load increases. System simulations have shown that LBT blocking can be severe for scheduled UL and deteriorates the overall performance of NR-U quite significantly. Exemplary results for the LBT blocking probabilities for scheduled UL in a dense deployment are illustrated in FIG. 3.

Figure 3:
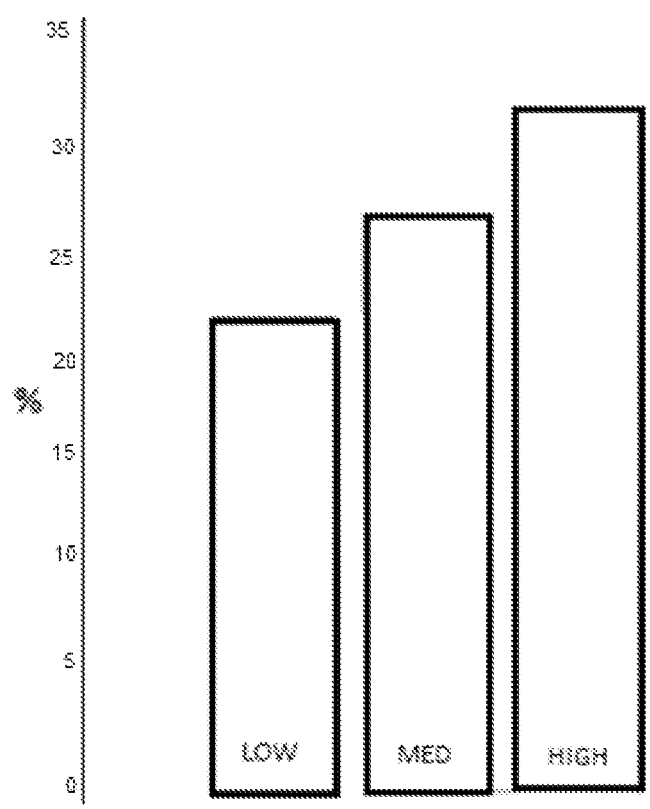
FIG. 3 shows UL Type 2 LBT failure rate for NR-U indoor deployment Option 2 in accordance with example embodiments of the invention at low, medium and high traffic loads according to the RAN1 NR-U SI simulation assumptions.

FIG. 3 shows UL Type 2 LBT failure rate for a dense NR-U indoor deployment of overlapping networks at low, medium and high traffic loads. As shown in FIG. 3 the failure rate for low traffic loads is around 20%; for medium traffic load is around 26%, and for high traffic loads is around 30%.

More importantly, UE may be in a challenging location with severe hidden node problem (i.e. having near-by interferers that the gNB is unaware of). UL transmissions may be repeatedly blocked for such UE causing dramatic decrease in link throughput and increase in latency, and not only for UL, but also for DL because PDSCH ACK/NACKs, a part of UCI, are dropped.

Furthermore, UL spectrum efficiency will reduce accordingly as the gNB may not be able to schedule other transmissions for the frequency resources blocked by the LBT.

Naturally, in a case where a scheduled UL transmission is not possible due to LBT, the gNB could schedule the UE another attempt (re-transmission). This, however, often comes with increased latency and downlink control signalling overhead, and may result in the UL transmission, e.g., PUSCH falling into a different COT.

Therefore, example embodiments of the invention as described here provide a novel solution to at least enable every UE to transmit at least UCI (including ACK/NACKs) after the DL portion of the gNB COT.

Before describing the example embodiments of the invention in further detail reference is made to FIG. 2. FIG. 2 shows a block diagram of one possible and non-limiting exemplary system in which the exemplary embodiments may be practiced. In FIG. 2, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver Rx, 132 and a transmitter Tx 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 may include an Access module 140 which is configured to perform the example embodiments of the invention as described herein. The Access module 150 may be implemented in hardware by itself of as part of the processors and/or the computer program code of the UE 110. The Access module 140 comprising one of or both parts 140-1 and/or 140-2, which may be implemented in a number of ways. The Access module 140 may be implemented in hardware as Access module 140-1, such as being implemented as part of the one or more processors 120. The Access module 140-1 may be implemented also as an integrated circuit or through other hardware such as a programmable gate array. In another example, the Access module 140 may be implemented as Access module 140-2, which is implemented as computer program code 123 and is executed by the one or more processors 120. Further, it is noted that the Access modules 140-1 and/or 140-2 are optional. For instance, the one or more memories 125 and the computer program code 123 may be configured, with the one or more processors 120, to cause the user equipment 110 to perform one or more of the operations as described herein. The UE 110 communicates with gNB 170 via a wireless link 111.

The gNB 170 (NR/5G Node B or possibly an evolved NB) is a base station (e.g., for LTE, long term evolution) that provides access by wireless devices such as the UE 110 to the wireless network 100. The gNB 170 includes one or more processors 152, one or more memories 155, one or more network interfaces (N/W I/F(s)) 161, and one or more transceivers 160 interconnected through one or more buses 157. Each of the one or more transceivers 160 includes a receiver Rx 162 and a transmitter Tx 163. The one or more transceivers 160 are connected to one or more antennas 158. The one or more memories 155 include computer program code 153. The gNB 170 includes an Access module 150 which is configured to perform example embodiments of the invention as described herein. The Access module 150 may comprise one of or both parts 150-1 and/or 150-2, which may be implemented in a number of ways. The Access module 150 may be implemented in hardware by itself or as part of the processors and/or the computer program code of the gNB 170. Access module 150-1, such as being implemented as part of the one or more processors 152. The Access module 150-1 may be implemented also as an integrated circuit or through other hardware such as a programmable gate array. In another example, the Access module 150 may be implemented as Access module 150-2, which is implemented as computer program code 153 and is executed by the one or more processors 152. Further, it is noted that the Access modules 150-1 and/or 150-2 are optional. For instance, the one or more memories 155 and the computer program code 153 may be configured to cause, with the one or more processors 152, the gNB 170 to perform one or more of the operations as described herein. The one or more network interfaces 161 communicate over a network such as via the links 176 and 131. Two or more gNB 170 may communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the gNB 170 being physically in a different location from the RRH, and the one or more buses 157 could be implemented in part as fiber optic cable to connect the other elements of the gNB 170 to the RRH 195.

It is noted that description herein indicates that "cells" perform functions, but it should be clear that the gNB that forms the cell will perform the functions. The cell makes up part of a gNB. That is, there can be multiple cells per gNB.

The wireless network 100 may include a network control element (NCE) 190 that may include MME (Mobility Management Entity)/SGW (Serving Gateway) functionality, and which provides connectivity with a further network, such as a telephone network and/or a data communications network (e.g., the Internet). The gNB 170 is coupled via a link 131 to the NCE 190. The link 131 may be implemented as, e.g., an S1 interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, gNB 170, and other functions as described herein.

It is noted that functionality(ies), in accordance with example embodiments of the invention, of any devices as shown in FIG. 2 e.g., the UE 110 and/or gNB 170 can also be implemented by other network nodes, e.g., a wireless or wired relay node (a.k.a., integrated access and/or backhaul (IAB) node). In the IAB case, UE functionalities may be carried out by MT (mobile termination) part of the IAB node, and gNB functionalities by DU (Data Unit) part of the IAB node, respectively. These devices can be linked to the UE 110 as in FIG. 2 at least via the wireless link 111 and/or via the NCE 190 using link 199 to Other Network(s)/Internet as in FIG. 2.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 2. A computer-readable medium may comprise a computer-readable storage medium or other device that may be any media or means that can contain or store the instructions for use by or in connection with an instruction execution system, apparatus, or device, such as a computer.

Example embodiments of the invention provide a specific combination for example in "Cat 1 Immediate transmission" and "Cat 2 LBT" operations of most relevant NR-U uplink scenario captured such as in FIG. 1C or Table 7.2.1.3.1-3 of the TR 38.889 Channel access schemes for a UL burst within a gNB-initiated COT as LBE device).

One core idea in accordance with example embodiments of the invention is presented in below. In this proposed scheme:

As a starting point, DL-to-UL gap at the UE is set to be 16 µs (this corresponding to CAT1 gap);

A UE scheduled for uplink transmission performs a single-shot LBT, that is, a single channel measurement or Clear Channel Assessment on the channel vacancy within the 16 µs gap (instead of 25 µs):

If the single-shot LBT is successful (i.e., the UE sees channel as unoccupied), UE follows Cat 2 LBT rules:

This may or may not include also prolonging the gap duration up to 25 us. The prolonging may be done e.g., by performing another 9 µs CCA slot right after the 16 µs or alternatively the prolonging may be done by self-deferral, After the gap, the UE may transmit until the end of the contiguous UL burst/portion of the gNB acquired COT or until the end of contiguous UL assignment scheduled to the UE, and In an embodiment, an additional gap in a predefined location(s) within the scheduled burst is provided allowing for a 25 µs Cat 2 LBT for other UEs in the cell.

If the single-shot LBT is not successful (i.e. the UE sees channel as busy), UE follows Cat 1 immediate transmission rules, and transmits immediately after the 16 µs gap:

In an embodiment, the at least first 9 µs of the transmission consists of a dummy signal, created e.g., by symbol repetition or extended CP. In other words, additional 9 µs of a dummy signal is added at the beginning of transmission when compared to the transmission following a successful single-shot LBT. This allows symbol level alignment between UEs following Cat1 LBT rules (single-shot LBT is not successful) and UEs following Cat 2 LBT rules (single-shot LBT was successful);

The following 2 bullets consider embodiments for another Cat 2 LBT in the case that UE is scheduled with multiple UL TTIs (e.g., slots comprising e.g., 14 OFDM symbols or mini-slots comprising less than 14 OFDM symbols):

If the UE has been scheduled with UL transmission in further consecutive slots or consecutive TTIs each containing all symbols or a portion of symbols of a slot, it also inserts an additional gap in a predefined location(s) within the scheduled burst to allow for an additional 25 µs Cat 2 LBT, referred further as Option 1. The UE may also provide via UCI to a gNB an indication that the channel was busy;

In an alternative approach, there is by default an additional gap in a predefined location(s) in the further consecutive slots within the scheduled burst allowing for a 25 µs Cat 2 LBT, referred further as Option 2:

In the case that single-shot LBT succeeds, e.g., in a first attempt, UE fills the gap(s) with a dummy signal, e.g., with symbol repetition or extended CP;

This way gNB reception, especially the OFDM symbol timing, is not affected by UE performing (or not performing) a 25 µs Cat 2 LBT.

It is noted that a scheduled uplink transmission may comprise PUSCH transmission or transmissions scheduled e.g., by UL grant or assignment. A scheduled UL transmission may comprise additionally or alternatively PUCCH transmission or transmissions scheduled e.g., by PUCCH resource indicator and PDSCH-to-HARQ feedback timing indicator in the DL control information containing DL assignment for PDSCH. PUCCH transmission may also be semi-persistently or periodically scheduled by configuration, possibly activated and de-activated by DL control information.

It is noted that a TTI, or Transmission Time Interval, is a parameter in digital telecommunication networks related to encapsulation of data from higher layers into frames for transmission on the radio link layer. TTI refers to the duration of a transmission on the radio link. The TTI is related to the size of the data blocks passed from the higher network layers to the radio link layer.

Further, it is noted that Cat 1 immediate transmission and Cat 2 LBT should be understood as generic frameworks. Wherein, in accordance with example embodiments of the invention certain modifications can be done for any or all of these LBT procedures (for example, related to Tx timing). Hence, wherein if the description as herein discloses that that Cat 2 LBT is performed, it does not mean that Cat 2 LBT procedure is exactly the same as Cat 2 LBT when used alone (i.e. when Cat 2 is not combined with Cat 1 immediate transmission as proposed herein).

Figure 4A:
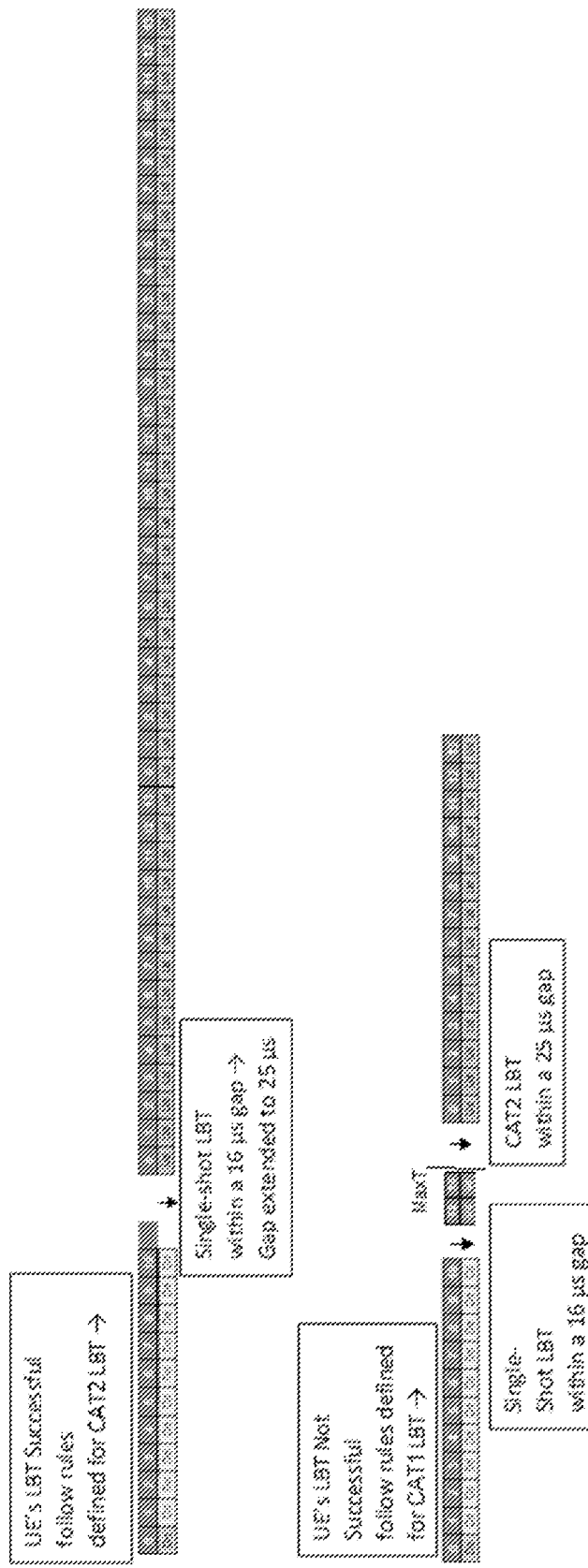
FIG. 4A and FIG. 4B show transmission portion differences between Option 1 and Option 2 in accordance with example embodiments of the invention.
Figure 4B:
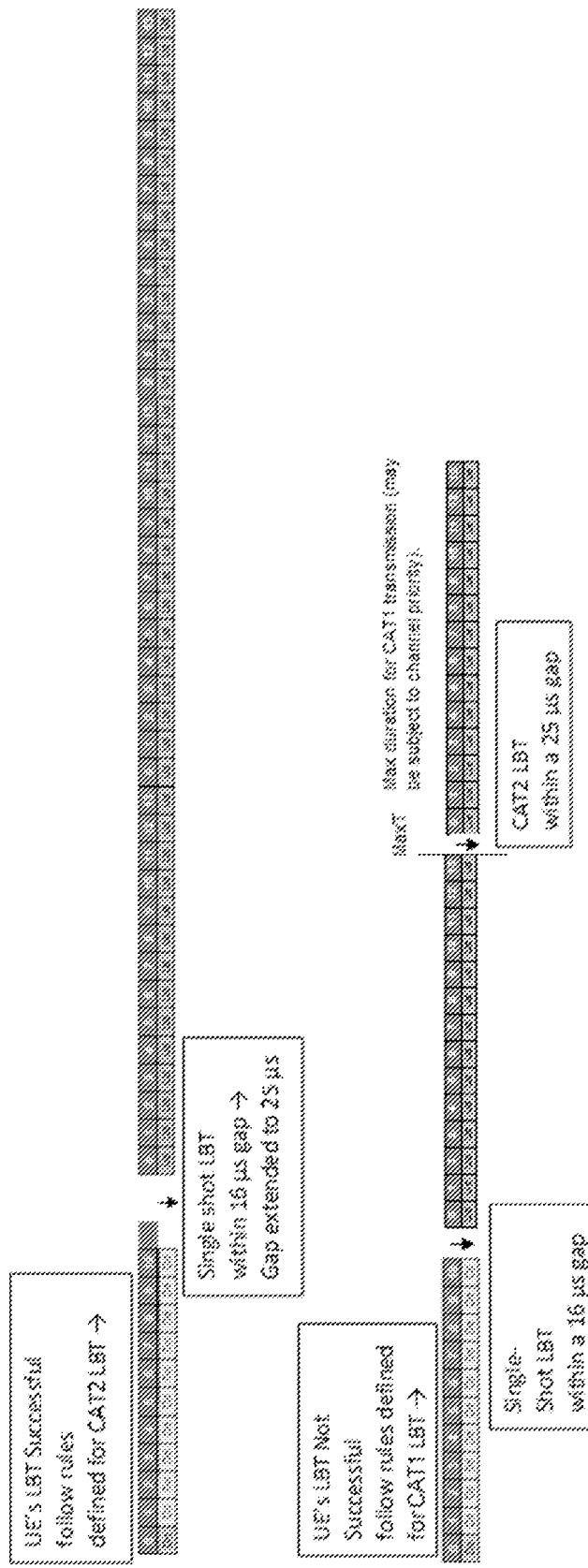

FIG. 4A and FIG. 4B each show an example for how the solution according to the invention could operate. FIG. 4A and FIG. 4B show transmission portion differences between Option 1 and Option 2 in accordance with example embodiments of the invention as described below.

As shown in FIG. 4A and FIG. 4B there are shown transmissions which follow defined rules for CAT1 LBT or CAT2 LBT, where UE's LBT is successful or not successful.

In accordance with example embodiments of the invention there is:

Option 1:

In the cases when the UE sees channel as busy during the 16 µs gap, as shown in FIG. 4A, the UE can transmit immediately a short PUCCH or other control signals. Before any subsequent transmissions, the UE will need to perform a Cat 2 LBT, Otherwise, if the UE sees channel as free within the 16 µs gap, as shown in FIG. 4A it may extend the gap up to 25 us, e.g., 16 us+9 us, and transmit according to gNB scheduling until the end of the UL burst without any further additional gaps; and Option 2: In the cases when LBT is unsuccessful, UE can transmit in addition to the short PUCCH, also PUSCH with a limited duration. There is a maximum duration (MaxT) defined for a transmission following Cat 1 immediate transmission (that is, no-LBT) with a 16 μs gap (the actual value for MaxT may be subject to the predefined channel priority class). The UE may have been scheduled to the multi-slot PUSCH transmission (within the COT):

If UE's LBT is successful within the 16 μs gap, it may extend the gap up to 25 us, and transmit according to gNB scheduling until the end of the UL burst or the end of the scheduled UL TTIs without any further gaps, If UE's LBT is not successful within the 16 μs gap, the UE may transmit until MaxT. After that, the UE may perform a Cat 2 LBT prior to further UL transmissions, and possibly insert a short gap of e.g., 25 μs prior to such transmission. In one preferred embodiment Cat 1 framework (Immediate transmission) should support at least transmission of HARQ-ACK at the beginning of a UL burst, i.e. PUCCH or PUSCH transmissions e.g., having a duration MaxT of 1 ms or 1 slot.

A difference between Option 1 and option 2 in FIG. 4A is whether PUSCH can be transmitted in the portion (without LBT) or not. A difference between option 1 and option 2 in both FIG. 4A and FIG. 4B is on the duration of UL transmission that UE can transmit before performing another LBT.

Figures 5, 6:
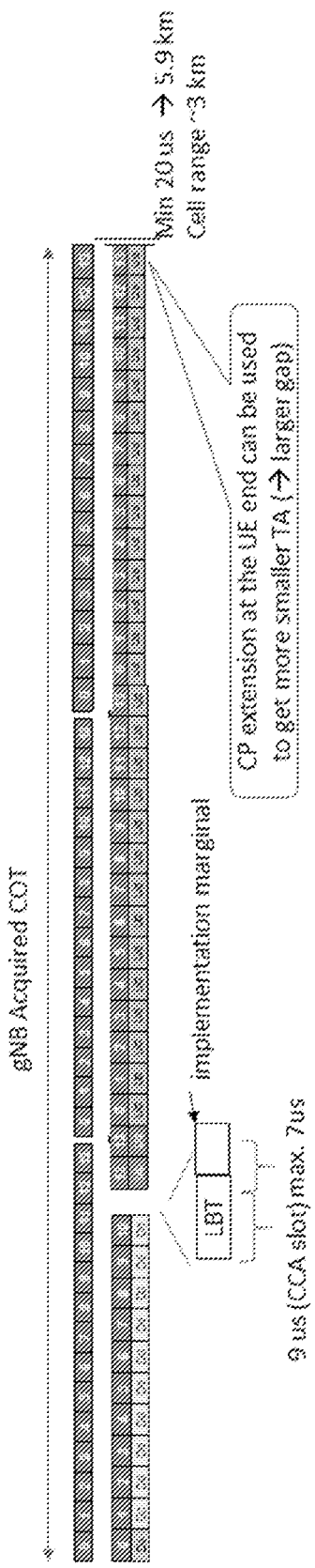
FIG. 5 shows timing gap, subcarrier spacing of a transmission in accordance with example embodiments of the invention.
FIG. 6 shows Symbol and CP durations based on NR numerology in accordance with example embodiments of the invention.

In addition to the rules/functionality discussed above, a key aspect of the invention is how to guarantee sufficient time for LBT within the 16 μs gap (constrained by Cat 1 procedure). FIG. 5 illustrates the considered scenario. FIG. 5 shows:

30 kHz subcarrier spacing (for other numerologies, see below). GP length=1 OFDM symbol (the length of one symbol+cyclic prefix (CP) is about 36 μs);

Timing advance value is set in such that 16 μs gap is achieved for all UEs in the cell minimum TA is about 20 μs (i.e. 16 μs for DL-to-UL gap, and 20 μs for TA);

Cat 2 LBT is performed within the 9 μs CCA slot. This means that 7 μs (of the 16 μs gap) can be used as "implementation marginal" at the UE for e.g., switching from DL reception (LBT) to UL transmission.

The example embodiments of the invention consider at least three separate embodiments to adjust timing of different UEs to support smooth implementation for LBT within 16 μs gap (according to Cat 1 operation). CP extension scheme and/or reservation signal can be used to guarantee at least a 7 μs gap for all UEs (see details below)

Numerology Options:

FIG. 6 shows Symbol and CP durations based on NR numerology in accordance with example embodiments of the invention. FIG. 6 shows the symbol length and CP length for different NR scenarios. As shown in FIG. 5, NR-U with 16 μs gap between DL and UL can be made by allocating one OFDM symbol for guard period. For 60 kHz SCS and larger, more than one OFDM symbol is needed. Gap of 2 symbols needed with 60 kHz SCS (with one OFDM symbol, cell range is limited to 270m). Also the 9 μs CCA slot as shown in FIG. 5 can contain some time for switching.

FIG. 7, FIG. 8, and FIG. 9 each show different timing options for the cases when UL single-shot LBT is negative (i.e. channel is found to be occupied) and the UE's operation is according to Cat 1 Immediate Transmission procedure. In the FIG. 7-FIG. 9, the first row presents the uplink timing for UEs located near to the gNB, the second row presents the uplink timing for UEs more far away from the gNB, and the third row presents the uplink timing for UEs located on the cell edge. For simplicity, the duration of the UL data part in FIG. 7-9 is the same (2 OFDM symbol for short PUCCH+3 full slots for PUSCH) regardless of the LBT. Hence, from data duration point of view, at least these figures FIG. 7, FIG. 8, and/or FIG. 9 can represent the case with LBT positive.

Timing Option #1, No CP Extension:

See FIG. 7 as FIG. 7 shows Timing option #1 in accordance with example embodiments of the invention;

In this approach as shown in FIG. 7 a UE timing advance (TA) is determined based on cell center UEs→all UEs have at least 20 μs TA:

cell center UEs (first row of FIG. 7) with TA=20 μs, cell edge UEs (third row of FIG. 7) have TA>20 μs;

As shown in FIG. 7 a 3 μs TA margin provides 450 m cell range→With this assumption, the gap is at least 13 μs for all UEs (9 μs CCA slot+at least 4 μs implementation marginal) while it is ensured that the gap remains no longer than 16 μs even for cell centre UEs (shown on the first row of FIG. 7).

Timing Option #2, CP Extension to Guarantee 16 μs Gap for all UEs:

See FIG. 8 as FIG. 8 shows Timing option #2 in accordance with example embodiments of the invention;

In this approach as shown in FIG. 8 a 16 μs gap is determined for all UEs. As shown in FIG. 8:

cell edge UEs (third row of FIG. 8) don't apply CP extension, (or alternatively, cell edge UEs apply a default amount of CP extension needed to create a 16 μs gap with OFDM symbol puncturing), cell center UEs (first row of FIG. 8) apply CP extension, (or alternatively, additional CP extension). The amount of (additional) CP extension decreases when moving towards the cell edge (based on the TA command). The extension can be applied autonomously by UE to fill the gap. For that purpose, gNB may signal to the UEs maximum TA value used in the cell, and UEs may apply (additional) CP extension corresponding to the difference between the maximum TA value and the TA value signalled to the UE, and Reservation/dummy signal is another option to fill the gap. This can be made e.g., by means of symbol repetition;

It can be noted that CP extension reduces the TA margin at the end of the UL portion of the COT (provided that next transmission starts at the symbol boundary. However, it can be noted that as shown in FIG. 8 there is plenty of room at the end of the slot (without increased GP overhead).

Figure 9A:
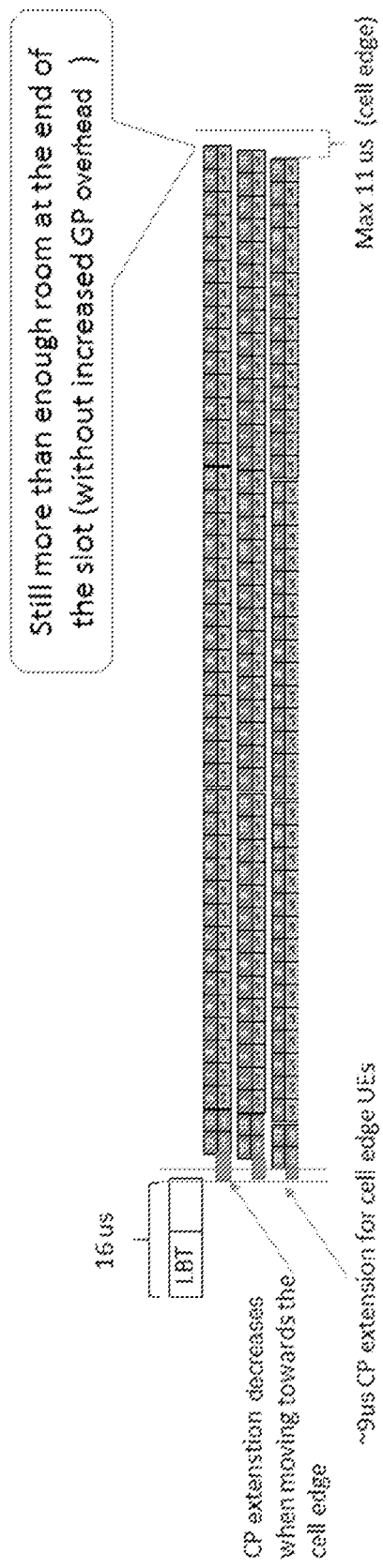
FIG. 9A shows Timing option #3 in accordance with example embodiments of the invention.

Timing Option #3, CP Extension Up-to 25 us:

See FIG. 9A as FIG. 9A shows Timing option #3 in accordance with example embodiments of the invention;

In this approach 25 μs gap is determined for all UEs. At least 9 μs of the ~25 μs gap is CP extension/reservation signal for UEs following Cat 1 (immediate transmission) procedure (LBT negative):

cell edge UEs (third row of FIG. 9A) apply CP extension of 9 μs, (or alternatively, cell edge UEs apply a CP extension of 9 μs additional to the default amount of CP extension needed to create a 16 µs gap with OFDM symbol puncturing), cell center UEs (first row of FIG. 9A) apply CP extension >9 µs (or alternatively, cell edge UEs apply a CP extension of >9 µs additional to the default amount of CP extension needed to create a 16 µs gap with OFDM symbol puncturing), and CP extension decreases when moving towards the cell edge (based on TA). The extension can be applied autonomously by UE to fill the gap. For that purpose, gNB may signal to the UEs maximum TA value used in the cell, and UEs may apply (additional) CP extension corresponding to the difference between the maximum TA value and the TA value signalled to the UE;

This approach can provide symbol level alignment between UEs operating according to Cat 2 framework and Cat 1 framework. This is beneficial as with the symbol level alignment, the channel access procedure used by the UE does not affect the OFDM symbol timing in the uplink reception at the gNB.

Again, it can be noted that CP extension reduces the TA margin at the end of the UL portion of the COT (provided that next transmission starts at the symbol boundary. However, it can be noted that as shown in FIG. 9A there is still plenty of room at the end of the slot (without increased GP overhead).

Figure 9B:
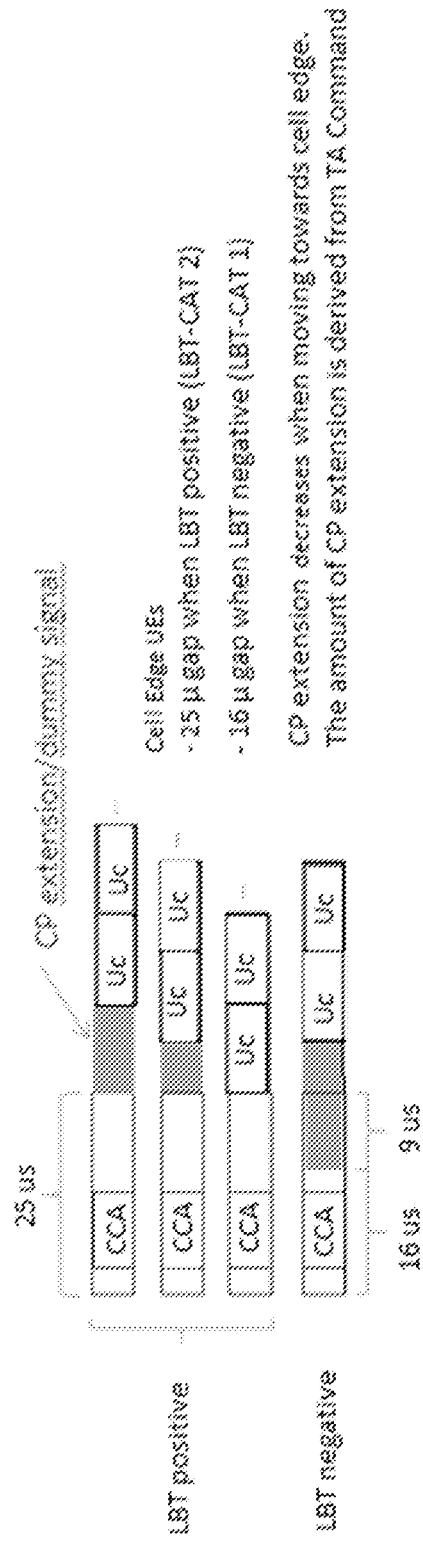
FIG. 9B shows the gap for LBT positive/LBT negative in accordance with the example embodiments.

FIG. 9B shows the gap for LBT positive/LBT negative in accordance with the example embodiments. As shown in FIG. 9B there is a 25 us gap when LBT is positive, and a 16 us gap when LBT is negative.

Figure 10:
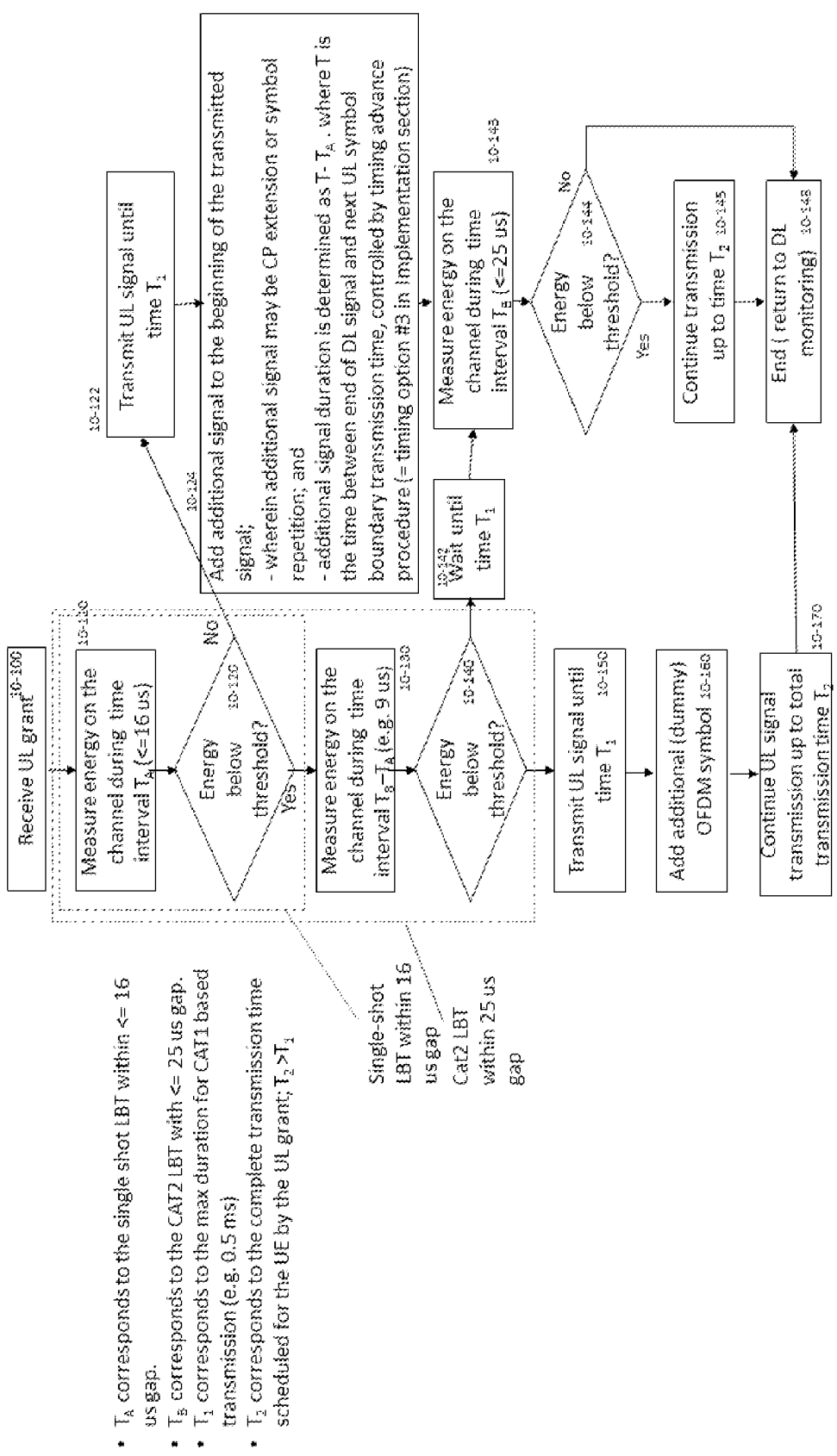
FIG. 10 shows a flow chart of at least one method in accordance with example embodiments of the invention.

FIG. 10 shows a flow chart of methods in accordance with example embodiments of the invention.

As indicated in FIG. 10:

$T_A$ corresponds to the single shot LBT within <=16 µs gap, $T_B$ corresponds to the CAT2 LBT with <=25 µs gap, $T_1$ corresponds to the max duration for CAT1 based transmission (e.g., 0.5 ms), and $T_2$ corresponds to the complete transmission time scheduled for the UE by the UL grant; $T_2 > T_1$ As shown in step 10-100 of FIG. 10 an UL grant is received. As shown in step 10-110 of FIG. 10 there is measuring energy on the channel during time interval $T_A$ which can be equal to or less than 16 µs. At step 10-120 of FIG. 10 there is determining whether the measured energy is below a threshold. If no, then at step 10-122 there is transmitting UL signal until time $T_1$. In accordance with example embodiments of the invention there can be as shown in step 10-124 of FIG. 10, adding additional signal to the beginning of the transmitted signal in step 10-122 of FIG. 10, wherein additional signal may be CP extension or symbol repetition; and additional signal duration is determined as $T-T_A$, where T is the time between end of DL signal and next UL symbol boundary transmission time, controlled by timing advance procedure. Then the method of step 10-124 goes to step 10-143 as will be described below. If the measured energy is below the threshold as in step 10-120 of FIG. 10 then as shown in step 10-130 of FIG. 10 there is additional measuring energy on the channel during time interval $T_B-T_A$ (e.g., 9 us). Then as shown in step 10-140 if the measured energy is below the threshold there is, as shown in step 10-150 of FIG. 10 transmitting the UL signal until time $T_1$. After this, as shown in step 10-160 there is adding additional dummy OFDM symbol or dummy signal. Then as shown in step 10-170 of FIG. 10 there is continuing UL signal transmission up to total transmission time $T_2$. Then there is at step 10-148 ending the operations and possibly returning to DL monitoring. In step 10-143 of FIG. 10 there is measuring energy on the channel during time interval $T_B$ (<=25 us). With regards to step 10-144 of FIG. 10 there is determining if the energy is below a threshold. If no at step 10-144 then there is at step 10-148 ending the operations and possibly returning to DL monitoring. If energy is below a threshold at step 10-144 then there is continuing UL signal transmission up to total transmission time $T_2$. Then there is at step 10-148 ending the operations and returning to DL monitoring.

Figure 11:
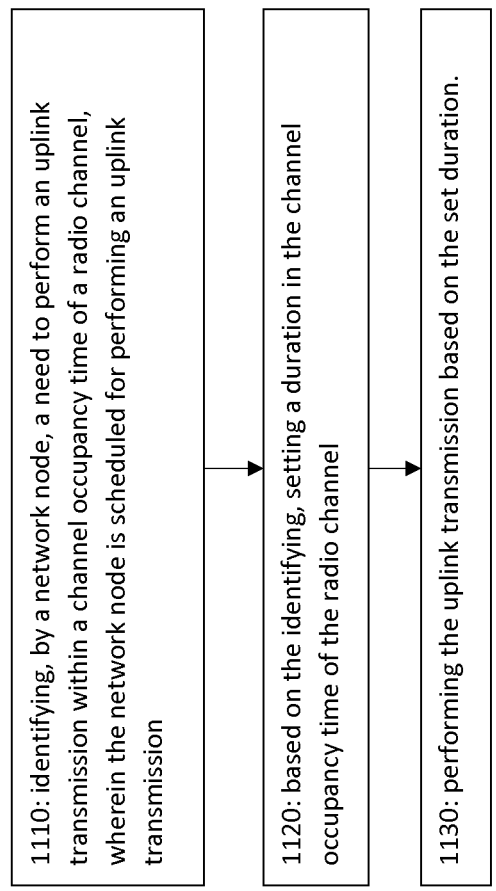
FIG. 11 shows a method as can be executed by an apparatus in accordance with example embodiments of the invention.

FIG. 11 illustrates operations in accordance with example embodiments of the invention which may be performed by a network device such as, but not limited to, the UE 110 or the gNB 170 as in FIG. 2. As shown in step 1110 of FIG. 11 there is identifying, by a network node, a need to perform an uplink transmission within a channel occupancy time of a radio channel, wherein the network node is scheduled for performing an uplink transmission. As shown in step 1120 of FIG. 11 there is, based on the identifying, setting a duration in the channel occupancy time of the radio channel. Then as shown in step 1130 of FIG. 11 there is performing the uplink transmission based on the set duration.

In accordance with example aspects of the embodiments as described in at least the paragraphs above, wherein setting the duration comprises at least one of setting a duration of a gap in the channel occupancy time and setting a duration of the uplink transmission.

In accordance with example aspects of the embodiments as described in at least the paragraphs above, there is identifying, based on an energy level of the gap in the channel occupancy time of the radio channel being one of above or below a threshold, whether the gap is occupied or not.

In accordance with the example aspects of the embodiments as described in at least the paragraphs above, wherein the setting further comprises setting based on the identifying, a duration of a gap in the channel occupancy time of radio channel; and performing the uplink transmission based on the set duration of the gap.

In accordance with example aspects of the embodiments as described in at least the paragraphs above, wherein the duration of the gap in the channel occupancy time lengthens the uplink transmission based on identifying that the energy level is below the threshold, and wherein the duration of the set gap in the channel occupancy time shortens the uplink transmission based on identifying that the energy level is above the threshold.

In accordance with the example aspects of the embodiments as described in at least the paragraphs above, wherein the energy level being below the threshold is indicative of a vacancy of the radio channel, and wherein the energy level being above the threshold is indicative of an occupancy of the radio channel.

In accordance with the example aspects of the embodiments as described in at least the paragraphs above, wherein the energy level being above or below the threshold is identified using a single listen before talk measurement interval.

In accordance with the example aspects of the embodiments as described in at least the paragraphs above, there is, based on the identifying, setting the duration of the gap for the uplink transmission to a first duration if the energy level of the gap is above the threshold; and setting the duration of the gap for the uplink transmission to a second duration exceeding the first duration if the energy level of the gap is below the threshold.

In accordance with the example aspects of the embodiments as described in at least the paragraphs above, there is, based on the identifying, setting the duration of the uplink transmission to a first duration if the energy level of the gap is above the threshold; and setting the duration of the uplink transmission to a second duration exceeding the first duration if the energy level of the gap is below the threshold.

In accordance with the example aspects of the embodiments as described in at least the paragraphs above, wherein the identifying comprises also determining based on downlink control information whether or not the UE is allowed to transmit according to the second Tx duration, in the case when the energy level of the gap being below the threshold.

In accordance with the example aspects of the embodiments as described in at least the paragraphs above, wherein the identifying comprises also determining based on downlink control information whether or not the UE should perform identifying of the energy level of the gap in the channel occupancy time of radio, in the case when the UE is scheduled to operate according to the first Tx duration.

In accordance with the example aspects of the embodiments as described in at least the paragraphs above, wherein based on the energy level of the gap being above the threshold the gap in the channel occupancy time of the radio channel comprises a DL-to-UL switching point and wherein the duration for the gap is set to be a first value.

In accordance with the example aspects of the embodiments as described in at least the paragraphs above, based on the energy level of the gap being below the threshold, the gap in the channel occupancy time of the radio channel comprises a DL-to-UL switching point and wherein the duration for the gap is set to be the second value.

In accordance with the example aspects of the embodiments as described in at least the paragraphs above, wherein each of the first value and the second value is set to a value ranging between 16 $\mu$s and 25 $\mu$s, and the method comprising: prolonging the transmission based on timing advance value.

In accordance with the example aspects of the embodiments as described in at least the paragraphs above, there is based on the energy level of the gap being below the threshold, the gap in the channel occupancy time of the radio channel comprises a DL-to-UL switching point and wherein the duration for the gap is set to be smaller than 25 $\mu$s.

In accordance with the example aspects of the embodiments as described in at least the paragraphs above, wherein the uplink transmission is not performed during the gap.

In accordance with the example aspects of the embodiments as described in at least the paragraphs above, wherein based on the energy level of the gap being above the threshold, the scheduled transmission is performed immediately after the gap during the channel occupancy time.

In accordance with the example aspects of the embodiments as described in at least the paragraphs above, wherein based on the energy level of the gap being below the threshold, further comprising inserting a dummy signal comprising one of symbol repetition or an extended cyclic prefix in at least one predefined location within one transmit time interval of the scheduled uplink transmission.

In accordance with the example aspects of the embodiments as described in at least the paragraphs above, wherein at least a first 9 $\mu$s of the uplink transmission comprises a dummy signal or an extended cyclic prefix, wherein an additional 9 $\mu$s of a dummy signal or extended cyclic prefix is added to a beginning of the uplink transmission.

In accordance with the example aspects of the embodiments as described in at least the paragraphs above, wherein the dummy signal allows symbol level alignment between more than one network node which uses the channel occupancy time.

In accordance with the example aspects of the embodiments as described in at least the paragraphs above, wherein the network node is scheduled with more than one transmission time interval for the uplink transmission.

In accordance with the example aspects of the embodiments as described in at least the paragraphs above, wherein based on identifying that the energy level of the gap being above the threshold the network node performs the uplink transmission using only the at least one transmission time interval within a first time duration, and based on identifying that the energy level of the gap being below the threshold the network node performs the uplink transmission using all scheduled transmission time intervals in a time duration exceeding the first time duration.

In accordance with the example aspects of the embodiments as described in at least the paragraphs above, there is inserting an additional gap in predefined locations within one of the scheduled uplink transmission; and performing an additional up to 25 $\mu$s listen before talk operation during the channel occupancy time.

In accordance with the example aspects of the embodiments as described in at least the paragraphs above, wherein based on the energy level of the gap not being above the threshold, the LBT is performed in 9 $\mu$s of the gap, wherein another 7 $\mu$s of the gap is used for DL-to-UL point.

In accordance with some example aspects of the embodiments of the invention as described herein there is means for identifying (Computer Program Code 123 and/or 153; Memory(ies) 125 and/or 155; Processors 120 and/or 152; and Access Module 140-1, 140-2, 150-1, and/or 150-2 as in FIG. 2), by a network node (UE 110 and/or gNB 170 as in FIG. 2), a need to perform an uplink transmission within a channel occupancy time of a radio channel, wherein the network node is scheduled for performing an uplink transmission; there is means, based on the identifying, for setting (Computer Program Code 123 and/or 153; Memory(ies) 125 and/or 155; Processors 120 and/or 152; and Access Module 140-1, 140-2, 150-1, and/or 150-2 as in FIG. 2) a duration of a gap in the channel occupancy time of the radio channel; and means for performing (Computer Program Code 123 and/or 153; Memory(ies) 125 and/or 155; Processors 120 and/or 152; and Access Module 140-1, 140-2, 150-1, and/or 150-2 as in FIG. 2) the uplink transmission based on the set duration of the gap.

In the example aspect of the invention according to the paragraph above, wherein at least the means for identifying, means for setting, and means for performing comprises a non-transitory computer readable medium [Memory(ies) 125 and/or 155 as in FIG. 2] encoded with a computer program [Computer Program Code 123 and/or 153 as in FIG. 2] executable by at least one processor [Processors 120 and/or 152; and Access Module 140-1, 140-2, 150-1, and/or 150-2 as in FIG. 2].

In accordance with an example embodiment of the invention, a UE may determine the UL LBT mechanism based on information received from PUSCH resource allocation grant. The UL LBT mechanism indicates at least one of:
  LBT type used for short PUCCH (if present),
  starting time for UL transmission containing PUSCH, indicated in terms of OFDM symbols, and
  Duration of the cyclic prefix preceding the uplink transmission containing PUSCH.

In an example embodiment, UL LBT mechanism is indicated by one or more bits (or information elements) in the PUSCH resource allocation grant.

The proposed functionality provides possibility for gNB to select the UCI feedback strategy or/and corresponding UL LBT mechanism dynamically e.g., based on the interference situation in the cell (see also FIG. 3), number of scheduled DL/UL UEs in the COT, different QoS requirements such as latency, different priorities between different UEs/channels, interference scenario, or/and duration of UL portion.

Mechanism I:
  In this case the short PUCCH (if present) is transmitted based on Cat1 immediate transmission, such that there is a 16 µs gap between the end of DL transmission and the start of short PUCCH.
  UE performs Cat 2 LBT for PUSCH after short PUCCH.
  PUSCH transmission starts from the first OFDM symbol after a short PUCCH and 25 µs gap.
  CP extension may be used in two places:
    the $1^{st}$ CP extension may be used before short PUCCH to ensure the gap has a duration of 16 µs. Alternatively, gNB may adjust the gap e.g., by repeating or puncturing the last DL symbol or by biasing the timing advance for the UEs in the cell, and
    the $2^{nd}$ CP extension is used before PUSCH. This extension may be used to keep short PUCCH and PUSCH on the same symbol raster while ensuring that the gap is up-to 25 µs.

Mechanism II:
  In this case the short PUCCH (if present) is transmitted based on Cat2 LBT framework,
  UE performs Cat 2 LBT after short DL portion of the COT, where the gap between the end of DL and the start of short PUCCH is up to 25 µs,
  Short PUCCH (if present) or PUSCH transmission starts from the first OFDM symbol after a 25 µs gap, and PUSCH follows short PUCCH (when present) without any gaps, and
    CP extension may be used in one place, just before short PUCCH/PUSCH.

It should be noted that the proposed functionality is not limited only to a short PUCCH but may be applied with any PUCCH format, or sounding reference signals.

Figure 12:
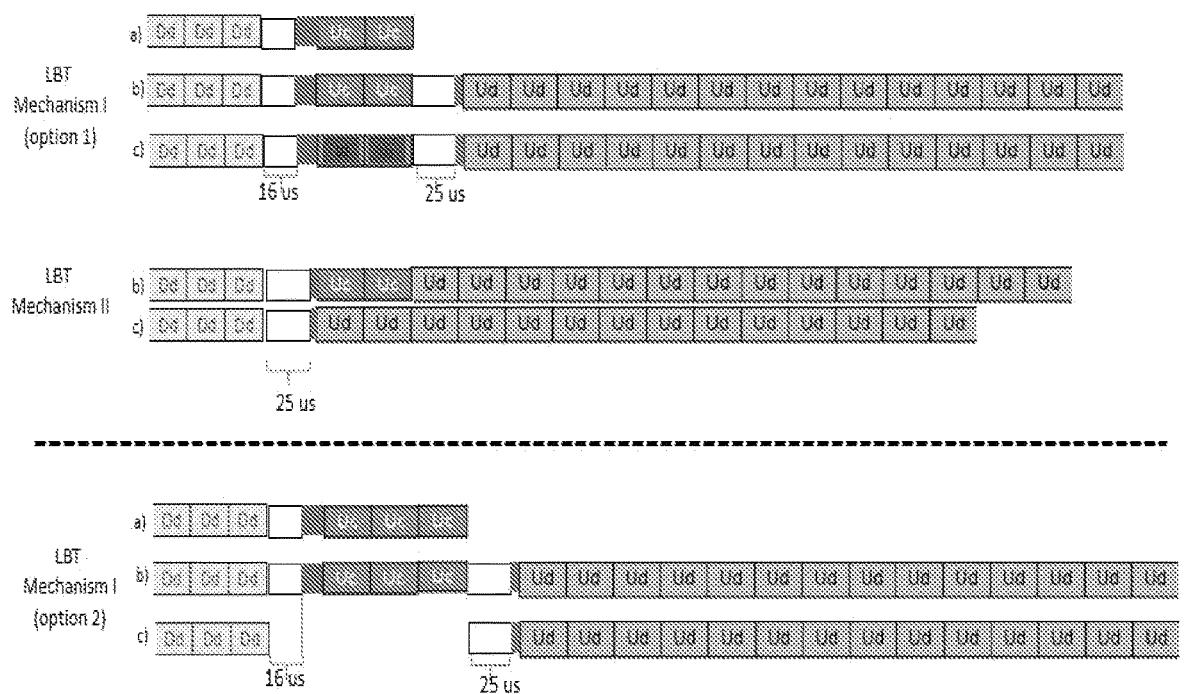
FIG. 12 illustrates in accordance with example embodiments of the invention two LBT mechanism: I and II.

FIG. 12 illustrates in accordance with example embodiments of the invention two options for LBT mechanism I (and three different cases for each option, a, b, and c)), as well as LBT mechanism II, where Dd, Uc, Ud, Us denote downlink data, uplink control, uplink data and a predefined signal (or a first signal), respectively. Following cases are considered:
  a) short PUCCH only,
  b) short PUCCH and PUSCH, or
  c) PUSCH only.

It should be noted that FIG. 12 shows only a part of the COT acquired by the gNB (focus is on the beginning of the UL portion of COT). Although this figure has been drawn for the case of single DL-UL switching point, it is equally valid for the case of multiple DL-UL switching points. In that case, the principle can be applied separately for each UL portion.

An issue to take into account is the regulatory limitation on the allowed transmission gap within a shared COT. According to ETSI EN 301 893 V2.1.1, grants to a single responding device, when making use of the paused COT, shall meet the following conditions:

The responding device transmissions from a single responding device occur within the maximum duration of a paused COT, The gap immediately preceding the first transmission by the responding device was preceded by the minimum paused COT gap time of 100 µs, and The responding device has performed a single 25 µs LBT with a resulting channel idle determination of idle.

In a cell, there may be resources reserved for Cat 1 channel access based UL transmissions immediately (with a gap of 16 µs) after the DL burst, and the Cat 2 LBT based transmission may start right after the Cat 1 based transmission (with a gap of 25 µs). However, there may be cases where no UE actually transmits on the resources reserved for the Cat 1 UL transmissions. This needs to be taken into account from the viewpoint of the subsequent Cat 2 LBT based transmission. The total gap duration with paused COT must be at least 100 µs+25 µs=125 µs, but the preceding Cat 1 transmission may be e.g., a 2 symbol PUCCH, resulting in a total gap of 16 µs+2×(33.33+2.344 µs)+25 µs=112.35 µs, which is not enough.

There are situations where gNB reserves resources for short PUCCH (e.g., for SR for other UEs), but there are no actual PUCCH transmissions (e.g., no positive SR from any UE, or when a UE has missed DL grants for PDSCH). Because of the ETSI rule related to paused COT, two options are presented for case c (PUSCH only):
  Option 1: the duration of short PUCCH is at most two OFDM symbols (assuming SCS 30 kHz). In order to fulfill the ETSI rule related to minimum pause of at least 100 µs or less than 25 µs, the UE needs to transmit a predefined signal during the short PUCCH,
  Option 2: the duration of short PUCCH is at least three OFDM symbols (assuming SCS 30 kHz). In absence of short PUCCH allocation, the UE can leave the short PUCCH unused (& still fulfill the ETSI rule).

When a UE has only short PUCCH to transmit, the UE may transmit a short PUCCH of only 2 symbols, i.e., the duration of short PUCCH (3 symbols or 2 symbols) may depend whether UE has following a PUSCH transmission or not.

In an embodiment, gNB indicates the number of symbols reserved for short PUCCH via downlink control information, e.g., using group common DCI (such as DCI format 2_0).

In the case that the $1^{st}$ gap is created only with UL CP extension, the gap preceding PUSCH is 3×(33.33+2.344 µs)+25 µs=132.0 µs which is enough to qualify as paused COT. However, if DL extension or timing advance biasing is used to adjust the $1^{st}$ gap duration, the gap is 2×(33.33+2.344 µs)+2×25 µs=121.3 µs or 2×(33.33+2.344 µs)+16 µs+25 µs=112.3 µs, which is not meeting the requirements for paused COT. In these cases the option 2 is needed. It should be noted that MulteFire release 1.0 supports the timing advance biasing.

As shown in FIG. 12, LBT Mechanism I, case c (option 1) may include a predefined signal that is used to fulfill the ETSI regulation related to so called Paused COT In frequency domain, "a predefined signal" follows the structure of short PUCCH (most likely block interlaced-based transmission). In time domain "predefined signal" is transmitted on the symbols reserved for short PUCCH. In an example embodiment, "predefined signal" is just a reservation signal occupying predefined frequency domain resource(s) of short PUCCH. These resources may be cell-specific and potentially used by multiple UEs. In some other scenarios, "a predefined signal" utilizes dedicated frequency domain resources (resource allocation is outside the scope of this IR), and the signal has a predefined usage, such as channel sounding. The exemplary use cases include:
- an acknowledgement of a correctly received PUSCH resource allocation grant;
- Sounding Reference Signal;
- Demodulation Reference Signal; and/or
- Channel State Information.

In an example embodiment, the options for indicating the LBT mechanism to a UE may be:
For UEs with short PUCCH:
- Solution 1: Explicit indication in the DL assignment (a separate bit);
- Solution 2: Included in the K1 or PDSCH-to-HARQ feedback timing indication configuration (configured by higher layer signaling) and dynamically indicated with the PDSCH-to-HARQ feedback timing indication; and/or
- Solution 3: LBT Mechanism II is used as default, and the selection between LBT Mechanism I/II is indicated via a group common PDCCH (GC-PDCCH) or other group common or cell common downlink control information. In order to avoid multiple symbol timings within a cell, UEs not receiving the GC-PDCCH (PDCCH failure) may assume 25 μs LBT gap and may not be able to send the short PUCCH.

It should be noted that different solutions are not mutually exclusive.
For UEs with PUSCH:
A UE receiving an UL grant for the 1st PUSCH slot:
Receives in the UL grant an indication of the LBT Mechanism
- if LBT Mechanism I: UE does Cat1 Immediate transmission after a gap of 16 μs, sends short PUCCH, does Cat2 LBT procedure, and sends PUSCH in case of a vacant channel:
  - If a UE does not otherwise have short PUCCH to transmit, it shall transmit "the predefined signal" discussed above (if operating according to option 1 shown in FIG. 12);
- LBT Mechanism II: UE does Cat2 LBT procedure, sends short PUCCH (if present) followed by PUSCH data in case of a vacant channel.

It should be noted that The UE may have received indication on the LBT mechanism from multiple sources: DL/UL/common DCIs.

Wideband operation needs to be taken into account in the NR-U operation. LBT measurement or clear channel assessment may be performed separately on each channel of e.g., 20 MHz. In the following, the band of each separate LBT measurement is referred to as an LBT sub-band. The bandwidth of LBT sub-band may be e.g., 20 MHz. It may be also some other value, e.g., 40 MHz. In the proposed scheme, UE may determine that PUSCH allocation covers more than one LBT sub-band (each e.g., 20 MHz), and based on determining the UE may prepare the short PUCCH and the related CP extension for case b/c (option 1) such that it covers all LBT sub-bands according to the PUSCH allocation. This prevents transmission gaps during the short PUCCH on any of LBT sub-bands scheduled for PUSCH.

In accordance with an example embodiment of the invention, in order to send UL signals via gNB acquired COT, the UE may need to be aware of the COT structure including the ending time of DL portion, and structure of short PUCCH, if present. The UE may obtain this information e.g., from one or more of the following sources:

- Different information elements of GC-PDCCH or other group common or cell common downlink control information;
- Higher layer configuration of short PUCCH formats;
- Dynamic indication of HARQ-ACK resource (e.g., with a PRI);
- Dynamic indication of PUSCH timing;
- Dynamic indication of HARQ-ACK timing.

Figure 13:
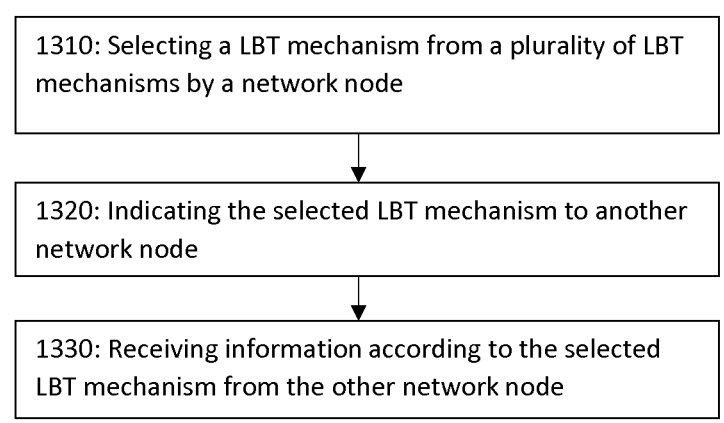
FIG. 13 shows a method as can be executed by an apparatus in accordance with example embodiments of the invention.

FIG. 13 illustrates operations in accordance with example embodiments of the invention which may be performed by a network node such as, but not limited to, the UE 110 or the gNB 170 as in FIG. 2. As shown in step 1310 of FIG. 13, a network node selects a LBT mechanism from a plurality of LBT mechanisms. As shown in step 1320 of FIG. 13, the network node indicates the selected LBT mechanism to another network node. Then as shown in step 1330 of FIG. 13 the network node receives information according to the selected LBT mechanism from the other network node.

Figure 14:
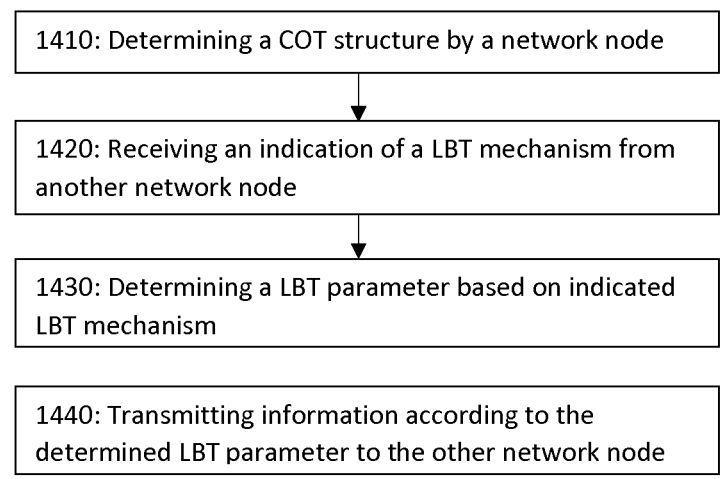
FIG. 14 shows a further method as can be executed by an apparatus in accordance with example embodiments of the invention.

FIG. 14 illustrates operations in accordance with example embodiments of the invention which may be performed by a network node such as, but not limited to, the UE 110 or the gNB 170 as in FIG. 2. As shown in step 1410 of FIG. 14, a network node determines a COT structure. As shown in step 1420 of FIG. 14, the network node receives an indication of a LBT mechanism from another network node. As shown in step 1430 of FIG. 14, the network node determines a LBT parameter based on the indicated LBT mechanism. Then as shown in step 1440 of FIG. 14 the network node transmits information according to the determined LBT parameter to the other network node.

In accordance with example aspects of the embodiments as described in at least the paragraphs above, wherein selecting a LBT mechanism from a plurality of LBT mechanisms is based on the interference situation in the cell (see also FIG. 3), number of scheduled DL/UL UEs in the COT, different QoS requirements such as latency, different priorities between different UEs/channels, interference scenario, or/and duration of UL portion.

In accordance with example aspects of the embodiments as described in at least the paragraphs above, wherein the selection of LBT mechanism is indicated by one or more bits (or information elements) in the PUSCH resource allocation grant, an indication in the DL assignment, a PDSCH-to-HARQ feedback timing indication, or in a group common or cell common downlink control information.

In accordance with example aspects of the embodiments as described in at least the paragraphs above, wherein the indication of selection of LBT mechanism includes at least one of a LBT type used for PUCCH (if present), a starting time for UL transmission containing PUSCH, and a duration of the cyclic prefix preceding the uplink transmission containing PUSCH.

In accordance with example aspects of the embodiments as described in at least the paragraphs above, wherein determining a COT structure by a network node includes at least partially determining the ending time of the DL portion or/and determining the structure of the first UL portion of the COT (e.g., PUCCH or/and PUSCH).

In accordance with example aspects of the embodiments as described in at least the paragraphs above, based on indicated UL LBT mechanism and the determined structure of the first UL portion of the COT, the network node creates a gap of (at most) 25 μs after a short PUCCH; performs Cat 2 LBT procedure during the gap; and starts UL transmission containing PUSCH immediately after the gap in the case that the channel is determined to be vacant during the Cat 2 LBT procedure.

In accordance with example aspects of the embodiments as described in at least the paragraphs above, the network node determines that HARQ-ACK needs to be transmitted via PUCCH; and transmits HARQ-ACK via PUCCH according to "Cat1 immediate transmission".

In accordance with example aspects of the embodiments as described in at least the paragraphs above, the network node based on the determined structure of the first UL portion of the COT creates a 16 μs gap after the DL portion of the COT prior the transmission of HARQ-ACK via PUCCH.

In accordance with example aspects of the embodiments as described in at least the paragraphs above, the network node determines that HARQ-ACK is not transmitted via PUCCH; creates a predefined signal or a first signal; and transmits a predefined signal or a first signal via PUCCH according to "Cat1 immediate transmission".

In accordance with example aspects of the embodiments as described in at least the paragraphs above, the network node based on the determined structure of the first UL portion of the COT creates a 16 μs gap after the DL portion of the COT prior the transmission of a predefined signal via PUCCH.

In accordance with example aspects of the embodiments as described in at least the paragraph above, wherein the first signal comprises at least one of: an acknowledgement of a correctly received PUSCH resource allocation grant, a sounding reference signal, a demodulation reference signal, and a channel state information.

In accordance with example aspects of the embodiments as described in at least the paragraphs above, the network node based on indicated UL LBT mechanism creates a 25 μs gap after DL portion of the COT; and starts UL transmission containing PUSCH right after the 25 μs gap.

In accordance with example aspects of the embodiments as described in at least the paragraph above, if the network node determines that HARQ-ACK needs to be transmitted via PUCCH, it transmits HARQ-ACK via PUCCH and transmits PUSCH immediately after the PUCCH; if the network node determines that PUCCH is not present in the UL portion of the COT, it transmits PUSCH starting from the first symbol of the UL portion of the COT.

In accordance with example aspects of the embodiments as described in at least the paragraphs above, the network node determines that PUSCH allocation covers more than one LBT sub-band, based on determining it prepares PUCCH such that it covers sub-bands according to PUSCH allocation, and transmits the prepared PUCCH; or based on determining it prepares PUCCH for one sub-band, prepares first signal for other sub-bands allocated for PUSCH, and transmits the prepared PUCCH and first signals.

In accordance with example aspects of the embodiments as described in at least the paragraphs above, the network node extends the PUCCH duration from 1 or 2 symbols to 3 symbols when UE transmits PUSCH following the PUCCH.

In accordance with some example aspects of the embodiments of the invention as described herein there is means for selecting (Computer Program Code 123 and/or 153; Memory(ies) 125 and/or 155; Processors 120 and/or 152; and Access Module 140-1, 140-2, 150-1, and/or 150-2 as in FIG. 2), by a network node (UE 110 and/or gNB 170 as in FIG. 2), a LBT mechanism from a plurality of LBT mechanisms; there is means for indicating (Computer Program Code 123 and/or 153; Memory(ies) 125 and/or 155; Processors 120 and/or 152; and Access Module 140-1, 140-2, 150-1, and/or 150-2 as in FIG. 2) the selected LBT mechanism to another network node; and means for receiving (Computer Program Code 123 and/or 153; Memory(ies) 125 and/or 155; Processors 120 and/or 152; and Access Module 140-1, 140-2, 150-1, and/or 150-2 as in FIG. 2) information according to the selected LBT mechanism from the other network node.

In the example aspect of the invention according to the paragraph above, wherein at least the means for selecting, means for indicating, and means for receiving comprises a non-transitory computer readable medium [Memory(ies) 125 and/or 155 as in FIG. 2] encoded with a computer program [Computer Program Code 123 and/or 153 as in FIG. 2] executable by at least one processor [Processors 120 and/or 152; and Access Module 140-1, 140-2, 150-1, and/or 150-2 as in FIG. 2].

In accordance with some example aspects of the embodiments of the invention as described herein there is means for determining (Computer Program Code 123 and/or 153; Memory(ies) 125 and/or 155; Processors 120 and/or 152; and Access Module 140-1, 140-2, 150-1, and/or 150-2 as in FIG. 2), by a network node (UE 110 and/or gNB 170 as in FIG. 2), a COT structure; there is means for receiving (Computer Program Code 123 and/or 153; Memory(ies) 125 and/or 155; Processors 120 and/or 152; and Access Module 140-1, 140-2, 150-1, and/or 150-2 as in FIG. 2) an indication of a LBT mechanism from another network node; there is means for determining (Computer Program Code 123 and/or 153; Memory(ies) 125 and/or 155; Processors 120 and/or 152; and Access Module 140-1, 140-2, 150-1, and/or 150-2 as in FIG. 2) a LBT parameter based on the indicated LBT mechanism; and means for transmitting (Computer Program Code 123 and/or 153; Memory(ies) 125 and/or 155; Processors 120 and/or 152; and Access Module 140-1, 140-2, 150-1, and/or 150-2 as in FIG. 2) information according to the determined LBT parameter to the other network node.

In the example aspect of the invention according to the paragraph above, wherein at least the means for determining, means for receiving, means for determining and means for transmitting comprises a non-transitory computer readable medium [Memory(ies) 125 and/or 155 as in FIG. 2] encoded with a computer program [Computer Program Code 123 and/or 153 as in FIG. 2] executable by at least one processor [Processors 120 and/or 152; and Access Module 140-1, 140-2, 150-1, and/or 150-2 as in FIG. 2].

Figure 15:
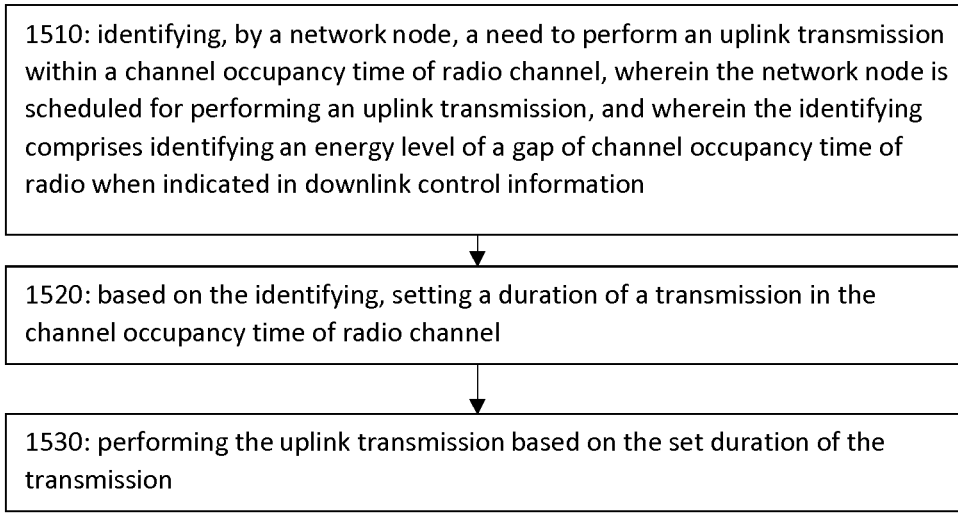
FIG. 15 illustrates yet another method as can be executed by an apparatus in accordance with example embodiments of the invention.

FIG. 15 illustrates further operations in accordance with example embodiments of the invention which may be performed by a network node such as, but not limited to, the UE 110 or the gNB 170 as in FIG. 2. As shown in step 1510 of FIG. 15 there is identifying, by a network node, a need to perform an uplink transmission within a channel occupancy time of radio channel, wherein the network node is scheduled for performing an uplink transmission, and wherein the identifying comprises identifying an energy level of a gap of channel occupancy time of radio when indicated in downlink control information. As shown in step 1520 of FIG. 15 there is, based on the identifying, setting a duration of a transmission in the channel occupancy time of radio channel. Then as shown in step 1530 of FIG. 15 there is performing the uplink transmission based on the set duration of the transmission.

In an example aspect of the invention, there is an apparatus, such as a user equipment side apparatus, comprising identifying, by a network node, a need to perform an uplink transmission within a channel occupancy time of radio channel, wherein the network node is scheduled for performing an uplink transmission, and wherein the identifying comprises identifying an energy level of a gap of channel occupancy time of radio when indicated in downlink control information; based on the identifying, setting a duration of a transmission in the channel occupancy time of radio channel; and performing the uplink transmission based on the set duration of the transmission.

In accordance with example embodiments of the invention as disclosed in the paragraph above, wherein the downlink control information comprises at least one information element indicating whether or not the network node should perform identifying of an energy level of the gap in the channel occupancy time of radio.

In accordance with example embodiments of the invention as disclosed in the paragraphs above, wherein determining based on downlink control information whether or not the UE should perform identifying of the energy level of the gap in the channel occupancy time of radio is carried out when the UE is scheduled to operate according to the first transmission (Tx) duration.

In accordance with example embodiments of the invention as disclosed in the paragraphs above, wherein the setting further comprises: setting a duration of a gap in the channel occupancy time of radio channel; and performing the uplink transmission based on the setting the duration of the gap.

In accordance with example embodiments of the invention as disclosed in the paragraphs above, wherein the setting comprises identifying, based on an energy level of the gap in the channel occupancy time of radio channel being one of above or below a threshold, whether the gap is occupied or not, wherein the energy level being above or below the threshold is identified using a single listen before talk measurement interval.

In accordance with example embodiments of the invention as disclosed in the paragraphs above, wherein there is based on the identifying, setting the duration of the transmission to a first transmission (Tx) duration if the energy level of the gap is above the threshold; and setting the duration of the transmission to a second transmission (Tx) duration exceeding the first duration if the energy level of the gap is below the threshold.

In accordance with example embodiments of the invention as disclosed in the paragraphs above, wherein the uplink transmission is not performed during the gap, wherein based on the energy level of the gap being above the threshold, the scheduled transmission is performed immediately after the gap during the channel occupancy time.

In accordance with example embodiments of the invention as disclosed in the paragraphs above, wherein the network node is scheduled with more than one transmission time interval for the uplink transmission.

In accordance with example embodiments of the invention as disclosed in the paragraphs above, wherein based on identifying that the energy level of the gap being above the threshold the network node performs the uplink transmission using the at least one transmission time interval within a first time duration, and wherein based on identifying that the energy level of the gap being below the threshold the network node performs the uplink transmission using all scheduled transmission time intervals in a time duration exceeding the first time duration.

In accordance with example embodiments of the invention as disclosed in the paragraphs above, wherein there is inserting an additional gap in predefined locations within one of the scheduled uplink transmission; and performing an additional up to 25 microseconds listen before talk operation during the channel occupancy time.

In accordance with example embodiments of the invention as disclosed in the paragraphs above, wherein based on the energy level of the gap not being above the threshold, a listen before talk procedure is performed in 9 microseconds of the gap.

In accordance with example embodiments of the invention as disclosed in the paragraphs above, wherein another 7 microseconds of the gap is used for DL-to-UL point.

In accordance with example embodiments of the invention as disclosed in the paragraphs above, wherein the identifying comprises also determining based on downlink control information whether or not the UE is allowed to transmit according to the second transmission (Tx) duration, in the case when the energy level of the gap being below the threshold.

In accordance with example embodiments of the invention as disclosed in the paragraphs above, wherein based on the energy level of the gap being below the threshold, there is inserting a dummy signal comprising one of symbol repetition or an extended cyclic prefix in at least one predefined location within one transmit time interval of the scheduled uplink transmission.

In accordance with example embodiments of the invention as disclosed in the paragraphs above, wherein at least a first 9 microseconds of the uplink transmission comprises a dummy signal or an extended cyclic prefix.

In accordance with example embodiments of the invention as disclosed in the paragraphs above, wherein an additional 9 microseconds of a dummy signal or extended cyclic prefix is added to a beginning of the uplink transmission, and wherein the dummy signal allows symbol level alignment between more than one network node which uses the channel occupancy time.

In accordance with example embodiments of the invention as disclosed in the paragraphs above, wherein the network node is embodied in a user equipment.

A non-transitory computer-readable medium storing program code, the program code executed by at least one processor to perform at least the method as described in the paragraphs above.

In accordance with some example aspects of the embodiments of the invention as described herein there is means for identifying (Computer Program Code 123 and/or 153; Memory(ies) 125 and/or 155; Processors 120 and/or 152; and Access Module 140-1, 140-2, 150-1, and/or 150-2 as in FIG. 2), by a network node (UE 110 and/or gNB 170 as in FIG. 2), a need to perform an uplink transmission within a channel occupancy time of radio channel, wherein the network node is scheduled for performing an uplink transmission, and wherein the identifying comprises means for identifying (Computer Program Code 123 and/or 153; Memory(ies) 125 and/or 155; Processors 120 and/or 152; and Access Module 140-1, 140-2, 150-1, and/or 150-2 as in FIG. 2) an energy level of a gap of channel occupancy time of radio when indicated in downlink control information; means, based on the identifying, for setting (Computer Program Code 123 and/or 153; Memory(ies) 125 and/or 155; Processors 120 and/or 152; and Access Module 140-1, 140-2, 150-1, and/or 150-2 as in FIG. 2) a duration of a transmission in the channel occupancy time of radio channel; and means for performing (Computer Program Code 123 and/or 153; Memory(ies) 125 and/or 155; Processors 120 and/or 152; and Access Module 140-1, 140-2, 150-1, and/or 150-2 as in FIG. 2) the uplink transmission based on the set duration of the transmission.

In the example aspect of the invention according to the paragraph above, wherein at least the means for identifying, means for setting, and means for performing comprises a non-transitory computer readable medium [Memory(ies)

125 and/or 155 as in FIG. 2] encoded with a computer program [Computer Program Code 123 and/or 153 as in FIG. 2] executable by at least one processor [Processors 120 and/or 152; and Access Module 140-1, 140-2, 150-1, and/or 150-2 as in FIG. 2].

Advantages of operations in accordance with example embodiments of the invention as disclosed herein include at least:

A specific LBT operation for Cat 1 immediate transmission scenario including:
  Adjustment of transmission of multi-TTI PUSCH based on LBT outcome, where in the adjustment may comprise the adjustment of the duration of contiguous UL transmission. The adjustment may comprise also or alternatively performing additional LBT procedure or inserting dummy signal at predefined time instances;
Solutions to guarantee sufficient time for Cat 2 LBT embedded in 16 μs gap;
Solutions to provide symbol level alignment between Cat1 immediate transmission and Cat 2 LBT;
Extension of the gap between DL and UL from 16 μs up to 25 μs depending on whether the UE sees the operating channel as free or not.
Improved UL access for NR-U: latency, throughput;
Compatible with current LBT framework agreed in 3GPP;
Feasible for UE implementation (esp. with enablers related to timing);
Smooth coexistence between two different LBT frameworks;
Improved system operation for NR-U: benefits of both channel access frameworks (Cat 1, Cat 2) can be obtained at the same time (without major problems/issues); and
Providing a possibility for gNB to select the UCI feedback strategy dynamically e.g., based on the interference situation in the cell.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" as may be used herein is intended to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

The invention claimed is:

1. A method, comprising:
   identifying, by a network node, a need to perform an uplink transmission within a channel occupancy time of radio channel,
   wherein the network node is scheduled for performing an uplink transmission, and
   wherein the identifying comprises identifying an energy level of a gap of channel occupancy time of radio when indicated in downlink control information;
     based on the identifying, setting a duration of a transmission in the channel occupancy time of radio channel,
     wherein the setting comprises identifying, based on an energy level of the gap in the channel occupancy time of radio channel being one of above or below a threshold, whether the gap is occupied or not, and wherein based on identifying that the energy level of the gap being above the threshold the network node performs the uplink transmission using the at least one transmission time interval within a first time duration, and
   wherein based on identifying that the energy level of the gap being below the threshold the network node performs the uplink transmission using all scheduled transmission time intervals in a time duration exceeding the first time duration; and
   performing the uplink transmission based on the set duration of the transmission,
   wherein the downlink control information comprises at least one information element indicating whether or not the network node should perform identifying of the energy level of the gap in the channel occupancy time of radio.

2. The method of claim 1, further comprising determining based on the downlink control information whether or not the network node should perform identifying of the energy level of the gap in the channel occupancy time of radio.

3. The method of claim 1, wherein the setting further comprises: setting a duration of a gap in the channel occupancy time of radio channel; and performing the uplink transmission based on the setting the duration of the gap.

4. An apparatus, comprising:
   at least one processor; and
   at least one non-transitory memory storing instructions, that when executed by the at least one processor, to cause the apparatus to at least:
   identify, by a network node, a need to perform an uplink transmission within a channel occupancy time of radio channel,
   wherein the network node is scheduled for performing an uplink transmission, and wherein the identifying comprises identifying an energy level of a gap of channel occupancy time of radio when indicated in downlink control information;
   based on the identifying, set a duration of a transmission in the channel occupancy time of radio channel,
   wherein the setting comprises identifying, based on an energy level of the gap in the channel occupancy time of radio channel being one of above or below a threshold, whether the gap is occupied or not, and wherein based on identifying that the energy level of the gap being above the threshold the network node performs the uplink transmission using the at least one transmission time interval within a first time duration, and
   wherein based on identifying that the energy level of the gap being below the threshold the network node performs the uplink transmission using all scheduled transmission time intervals in a time duration exceeding the first time duration; and
   perform the uplink transmission based on the set duration of the transmission,
   wherein the downlink control information comprises at least one information element indicating whether or not the network node should perform identifying of the energy level of the gap in the channel occupancy time of radio.

5. The apparatus of claim 4, further comprising determining wherein the at least one non-transitory memory is storing instructions that are executed by the at least one processor to cause the apparatus to:
   determine based on downlink control information whether or not the network node should perform identifying of the energy level of the gap in the channel occupancy time of radio.

6. The apparatus according to claim 4, wherein the setting further comprises: setting a duration of a gap in the channel occupancy time of radio channel; and
   performing the uplink transmission based on the setting the duration of the gap.

7. The apparatus of claim 6, wherein the duration of the gap is one of 16 microseconds or 25 microseconds.

8. The apparatus of claim 4, wherein the energy level being above or below the threshold is identified using a single listen before talk measurement interval.

9. The apparatus according to claim 4, wherein the at least one non-transitory memory is storing instructions that are executed by the at least one processor to cause the apparatus to:
   based on the identifying, set the duration of the transmission to a first transmission duration if the energy level of the gap is above the threshold; and
   set the duration of the transmission to a second transmission duration exceeding the first duration if the energy level of the gap is below the threshold.

10. The apparatus according to claim 4, wherein the uplink transmission is not performed during the gap.

11. The apparatus according to claim 4, wherein based on the energy level of the gap being above the threshold, the scheduled transmission is performed immediately after the gap during the channel occupancy time.

12. The apparatus according to claim 4, wherein the network node is scheduled with more than one transmission time interval for the uplink transmission.

13. The apparatus according to claim 4, wherein the at least one non-transitory memory is storing instructions that are executed by the at least one processor to cause the apparatus to:
   insert an additional gap in predefined locations within one of a scheduled uplink transmission; and perform an additional up to 25 microseconds listen before talk operation during the channel occupancy time.

14. The apparatus according to claim 4, wherein based on the energy level of the gap not being above the threshold, listen before talk procedure is performed in 9 microseconds of the gap, wherein another 7 microseconds of the gap is used for a downlink to uplink point.

15. The apparatus according to claim 4, wherein the downlink control information comprises at least one information element indicating whether or not the network node is allowed to transmit according to a second transmission duration, in the case the energy level of the gap is below the threshold.

16. An apparatus, comprising:
   at least one processor; and
   at least one non-transitory memory storing instructions, that when executed by the at least one processor, to cause the apparatus to at least:
   identify, by a network node, a need to perform an uplink transmission within a channel occupancy time of radio channel,
   wherein the network node is scheduled for performing an uplink transmission, and wherein the identifying comprises identifying an energy level of a gap of channel occupancy time of radio when indicated in downlink control information;
   based on the identifying, set a duration of a transmission in the channel occupancy time of radio channel,
   wherein the setting comprises identifying, based on an energy level of the gap in the channel occupancy time of radio channel being one of above or below a threshold, whether the gap is occupied or not, and wherein based on identifying that the energy level of the gap being above the threshold the network node performs the uplink transmission using the at least one transmission time interval within a first time duration, and
   wherein based on identifying that the energy level of the gap being below the threshold the network node performs the uplink transmission using all scheduled transmission time intervals in a time duration exceeding the first time duration; and perform the uplink transmission based on the set duration of the transmission; and based on the energy level of the gap being below a threshold, insert a dummy signal comprising one of symbol repetition or an extended cyclic prefix in at least one predefined location within one transmit time interval of the scheduled uplink transmission.

* * * * *